US012694637B2

(12) United States Patent
Ishikawa et al.

(10) Patent No.: US 12,694,637 B2
(45) Date of Patent: Jul. 28, 2026

(54) OCCUPANT IMAGING DEVICE

(71) Applicant: DENSO CORPORATION, Kariya-city (JP)

(72) Inventors: Takahiro Ishikawa, Kariya-city (JP); Mitsutoshi Nagata, Kariya-city (JP); Tomoya Yamashita, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 77 days.

(21) Appl. No.: 18/532,997

(22) Filed: Dec. 7, 2023

(65) Prior Publication Data

US 2024/0100946 A1    Mar. 28, 2024

Related U.S. Application Data

(63) Continuation of application No. PCT/JP2022/019680, filed on May 9, 2022.

(30) Foreign Application Priority Data

Jun. 9, 2021    (JP) ................................. 2021-096648

(51) Int. Cl.
*G06V 10/141*        (2022.01)
*B60K 35/10*         (2024.01)
(Continued)

(52) U.S. Cl.
CPC ............ *G06V 10/141* (2022.01); *B60K 35/10* (2024.01); *B60K 35/22* (2024.01); *B60K 35/50* (2024.01);
(Continued)

(58) Field of Classification Search
CPC ................ B60K 35/50; B60K 2360/21; B60K 2360/332; G06V 10/141; G06V 20/597; B60Y 2400/3015
(Continued)

(56) References Cited

U.S. PATENT DOCUMENTS

| | | | | |
|---|---|---|---|---|
| 10,055,658 B2 * | 8/2018 | Nagai | ................... | G06V 20/597 |
| 11,017,558 B2 * | 5/2021 | Noble | .................... | G06V 20/59 |

(Continued)

FOREIGN PATENT DOCUMENTS

| | | |
|---|---|---|
| JP | 2007-255971 A | 10/2007 |
| JP | 2012-230589 A | 11/2012 |

(Continued)

*Primary Examiner* — Zhen Y Wu
(74) *Attorney, Agent, or Firm* — Precision Patents, P.C.

(57) ABSTRACT

An occupant imaging device captures images of occupants inside a vehicle in which a display device having a display area is provided in front of and between a driver's seat and a passenger seat. The occupant imaging device includes an illumination unit that illuminates an area around the face of an occupant seated in a seat, and an imaging unit that captures images of the area around the face of the occupant seated in the seat. The display device includes an outer frame extending on at least left and right sides of the display area. The illumination unit and the imaging unit are arranged in the vertical direction in a region of the outer frame of the display device excluding a passenger seat side portion. The imaging unit captures images of an area around the face of an occupant including at least a driver seated in the driver's seat.

14 Claims, 26 Drawing Sheets

(51) Int. Cl.
　　*B60K 35/22* 　　　(2024.01)
　　*B60K 35/50* 　　　(2024.01)
　　*B60K 35/65* 　　　(2024.01)
　　*G06V 20/59* 　　　(2022.01)

(52) U.S. Cl.
　　CPC .......... *B60K 35/654* (2024.01); *B60K 35/656* (2024.01); *G06V 20/597* (2022.01); *B60K 2360/21* (2024.01); *B60K 2360/332* (2024.01); *B60Y 2400/3015* (2013.01)

(58) Field of Classification Search
　　USPC ....................................................... 340/573.1
　　See application file for complete search history.

(56) References Cited

U.S. PATENT DOCUMENTS

| | | | | | |
|---|---|---|---|---|---|
| 11,465,561 | B2 * | 10/2022 | Peterson | ................. | B60R 1/025 |
| 11,527,082 | B2 * | 12/2022 | Arora | .................. | G06V 40/171 |
| 11,639,134 | B1 * | 5/2023 | Huizen | .................. | B60R 1/088 |
| | | | | | 348/77 |
| 11,780,372 | B2 * | 10/2023 | Sobecki | ................... | B60R 1/12 |
| | | | | | 348/148 |

| | | | | | |
|---|---|---|---|---|---|
| 2006/0087582 | A1 * | 4/2006 | Scharenbroch | ...... | G06V 10/993 |
| | | | | | 348/370 |
| 2010/0073584 | A1 * | 3/2010 | Harbach | ............... | G08B 21/06 |
| | | | | | 349/1 |
| 2016/0129839 | A1 * | 5/2016 | Kim | ...................... | H04N 23/55 |
| | | | | | 348/148 |
| 2016/0248957 | A1 * | 8/2016 | Kim | ...................... | G06V 20/597 |
| 2016/0249073 | A1 * | 8/2016 | Margis | ............... | B64D 11/0638 |
| 2017/0177935 | A1 * | 6/2017 | Weller | ................... | G06V 40/19 |
| 2018/0307269 | A1 * | 10/2018 | Pantel | ................... | H10K 59/40 |
| 2019/0285968 | A1 * | 9/2019 | Hoshino | ............. | G03B 11/045 |
| 2020/0353865 | A1 * | 11/2020 | Nakamura | ............ | H04N 23/56 |
| 2020/0387724 | A1 * | 12/2020 | Maruyama | ............ | B60K 35/60 |
| 2023/0116821 | A1 * | 4/2023 | Ikumi | ................... | B60K 37/20 |
| | | | | | 361/807 |
| 2023/0419691 | A1 * | 12/2023 | Ward | ................... | G06V 20/597 |
| 2024/0073540 | A1 * | 2/2024 | Lintz | ..................... | B60Q 11/00 |

FOREIGN PATENT DOCUMENTS

| | | | |
|---|---|---|---|
| JP | | 2013-86750 A | 5/2013 |
| JP | | 2017-114165 A | 6/2017 |
| JP | | 2019-014359 A | 1/2019 |
| JP | | 2019-014360 A | 1/2019 |

* cited by examiner

FIG.15

OCCUPANT IMAGING DEVICE

CROSS-REFERENCE TO RELATED APPLICATION

The present application is a continuation application of International Application No. PCT/JP2022/019680, filed on May 9, 2022, which claims priority to Japanese Patent Application No. 2021-096648, filed in Japan on Jun. 9, 2021. The contents of these applications are incorporated herein by reference in their entirety.

BACKGROUND

1. Technical Field

The present disclosure relates to occupant imaging devices.

2. Related Art

Occupant status monitoring systems are provided for monitoring the condition of occupants in vehicles such as automobiles. A driver status monitoring system that monitors the driver's condition includes an imaging unit that captures images of an area around the headrest of the driver's seat and an illumination unit that illuminates an area around the headrest of the driver's seat. The driver status monitoring system uses the imaging unit to capture images of an area around the driver's face illuminated with light while the driver is seated in the driver's seat, and analyzes the driver's facial images included in the captured images to thereby monitor the driver's condition.

SUMMARY

The present disclosure provides an occupant imaging device. As an aspect of the present disclosure, an occupant imaging device captures images of occupants inside a vehicle in which a display device having a display area is provided in front of and between a driver's seat and a passenger seat. The occupant imaging device includes an illumination unit and an imaging unit. The illumination unit illuminates an area around the face of an occupant seated in a seat. The imaging unit captures images of the area around the face of the occupant seated in the seat. The display device includes an outer frame extending on at least left and right sides of the display area. The illumination unit and the imaging unit are arranged in the vertical direction in a region of the outer frame of the display device excluding a passenger seat side portion. The imaging unit captures images of an area around the face of an occupant including at least a driver seated in the driver's seat.

BRIEF DESCRIPTION OF THE DRAWINGS

In the accompanying drawings:

Figure 15:
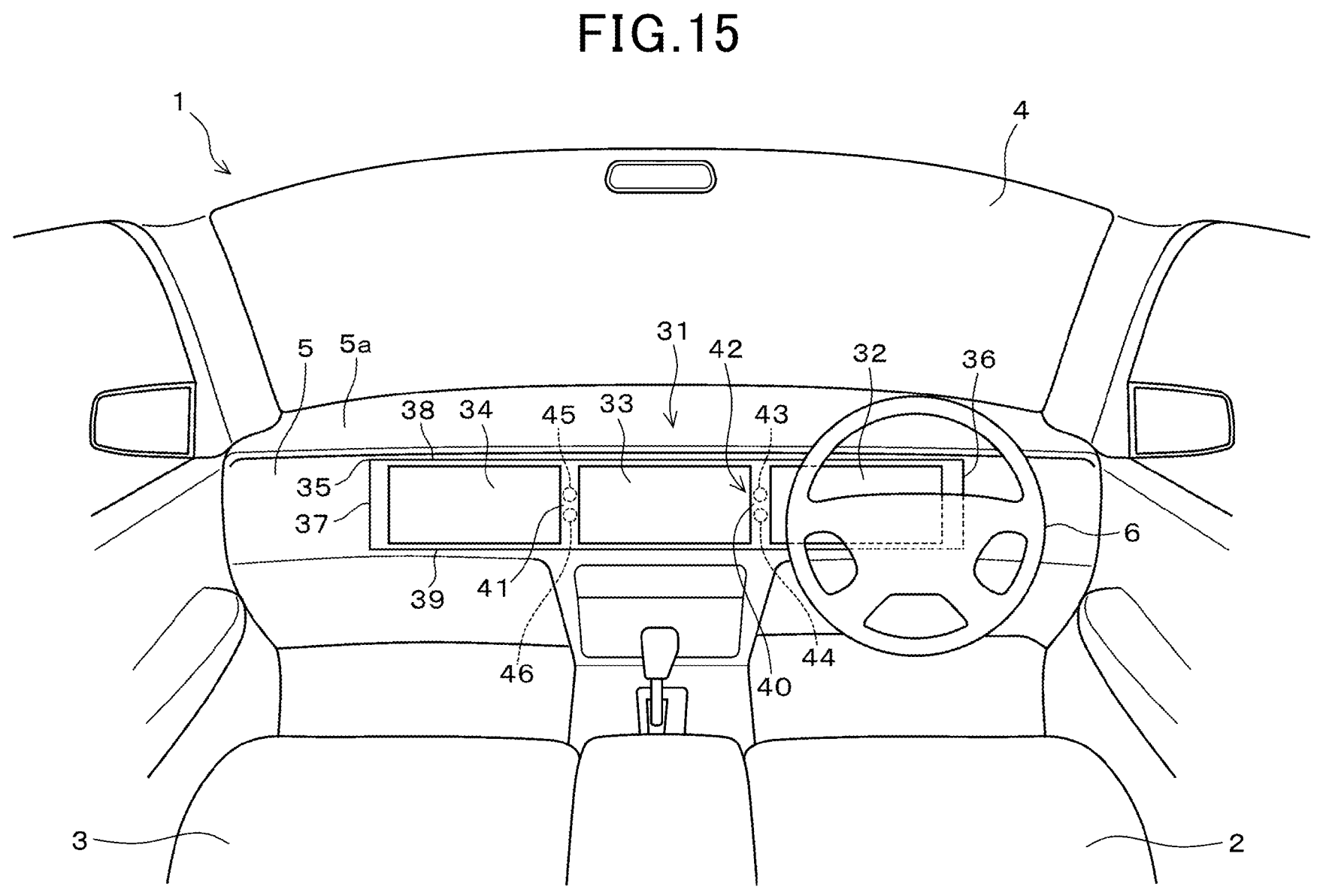

FIG. 15 is a diagram illustrating an interior of a vehicle in a fifth embodiment;

DETAILED DESCRIPTION OF THE PREFERRED EMBODIMENTS

Figure 1:
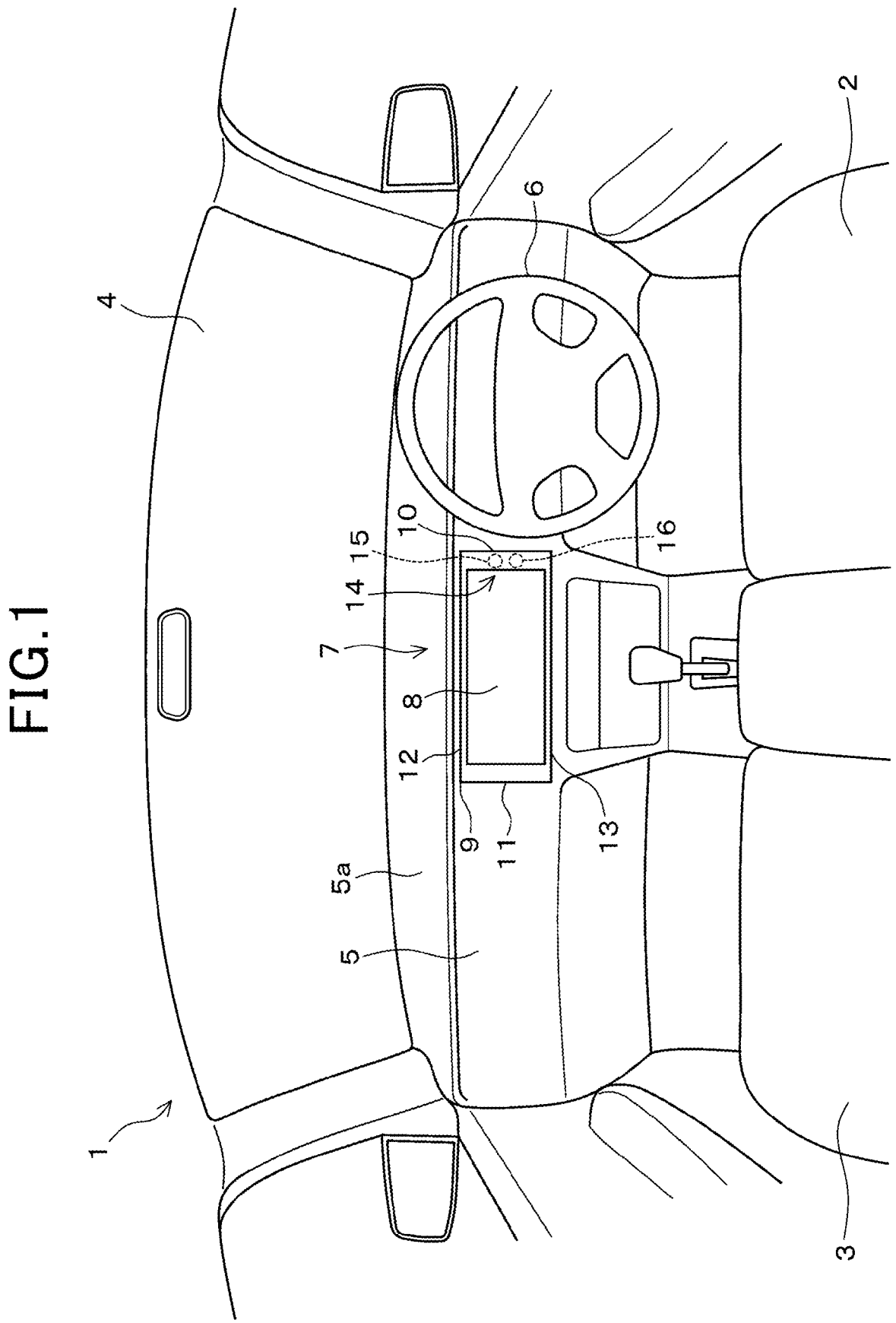
FIG. 1 is a diagram illustrating an interior of a vehicle in a first embodiment.

A display device is provided in front of and between the driver's seat and the passenger seat in the vehicle, and the display device has a display area that displays various screens such as a navigation screen and an audio screen. For example, JP 2019-14359 A discloses a configuration in which the imaging unit and the illumination unit are incorporated in the display device. This configuration uses an outer frame surrounding the display area, and the imaging unit is disposed in a driver's seat side outer frame and the illumination unit is disposed in a passenger seat side outer frame. Further, a configuration is also conceivable, in which the imaging unit and the illumination unit are arranged in the horizontal direction in an upper outer frame.

In the configuration disclosed in JP 2019-14359 A, in which the imaging unit and the illumination unit are separated with the display device therebetween, separate substrates are required for mounting the imaging unit and for mounting the illumination unit. This poses a problem in that the number of parts increases and the display device increases in size. Furthermore, there is also a problem of long routing between the imaging unit and the illumination unit. In addition, with an increase in angular difference between the optical axes of the imaging unit and the illumination unit, a shadow is created on the driver's face illuminated with light, reducing the detection accuracy in image recognition.

In a configuration in which the imaging unit and the illumination unit are arranged in the horizontal direction in the upper outer frame, the height of the display device increases, which may obstruct the driver's field of vision. In particular, if an overhead console is provided on the ceiling, the driver's field of vision may be further obstructed.

The present disclosure has been made to prevent the display device from increasing in size, prevent a decrease in detection accuracy in image recognition, shorten the routing between the imaging unit and the illumination unit, and ensure an appropriate field of vision for the driver.

According to an aspect of the present disclosure, an occupant imaging device captures images of occupants inside a vehicle in which a display device having a display area is provided in front of and between a driver's seat and a passenger seat. The illumination unit illuminates an area around the face of an occupant seated in a seat. The imaging unit captures images of the area around the face of the occupant seated in the seat. The display device includes an outer frame extending on at least left and right sides of the display area. The illumination unit and the imaging unit are arranged in the vertical direction in a region of the outer frame of the display device excluding a passenger seat side portion. The imaging unit captures images of an area around the face of an occupant including at least a driver seated in the driver's seat.

Since the illumination unit and the imaging unit are arranged in the vertical direction in the outer frame of the display device excluding a passenger seat side portion, the substrate on which the imaging unit is mounted and the substrate on which the illumination unit is mounted can be common, reducing the number of parts to thereby prevent the display device from increasing in size. Furthermore, the routing between the imaging unit and the illumination unit can be shortened. Furthermore, the angular difference between the optical axes of the imaging unit and the illumination unit can be reduced, preventing a decrease in detection accuracy in image recognition. In addition, the display device can be at a minimum height, ensuring an appropriate field of vision for the driver. Accordingly, in a configuration in which an imaging unit and an illumination unit are incorporated in a display device having a display area, it is possible to prevent the display device from increasing in size, prevent a decrease in detection accuracy in image recognition, shorten the routing between the imaging unit and the illumination unit, and ensure an appropriate field of vision for the driver.

According to an aspect of the present disclosure, an occupant imaging device captures images of occupants inside a vehicle in which a display device having a plurality of display areas arranged side by side in the horizontal direction is provided in front of and between a driver's seat and a passenger seat. The illumination unit illuminates an area around the face of an occupant seated in a seat. The imaging unit captures images of the area around the face of the occupant seated in the seat. The display device includes an outer frame extending on at least left and right sides of the display area. The illumination unit and the imaging unit are arranged in the vertical direction in a region of the outer frame of the display device excluding a passenger seat side portion or in a connecting section between the display areas. The imaging unit captures images of an area around the face of an occupant including at least a driver seated in the driver's seat.

Since the illumination unit and the imaging unit are arranged in the vertical direction in the outer frame of the display device excluding a passenger seat side portion or in a connecting section between the display areas, the substrate on which the imaging unit is mounted and the substrate on which the illumination unit is mounted can be common, reducing the number of parts to thereby prevent the display device from increasing in size. Furthermore, the routing between the imaging unit and the illumination unit can be shortened. Furthermore, the angular difference between the optical axes of the imaging unit and the illumination unit can be reduced, preventing a decrease in detection accuracy in image recognition. In addition, the display device can be at a minimum height, ensuring an appropriate field of vision for the driver. Accordingly, in a configuration in which an imaging unit and an illumination unit are incorporated in a display device having a plurality of display areas arranged side by side in the horizontal direction, it is possible to prevent the display device from increasing in size, prevent a decrease in detection accuracy in image recognition, shorten the routing between the imaging unit and the illumination unit, and ensure an appropriate field of vision for the driver.

The above and other objects, features and advantages of the present disclosure will become apparent from the following detailed description with reference to the accompanying drawings.

With reference to the drawing, some embodiments will be described. In each of the embodiments described below, components corresponding to those described in the preceding embodiments are denoted by the same reference signs, and duplicated description thereof may be omitted. In addition, the horizontal direction refers to a vehicle width direction, the longitudinal direction refers to a vehicle length direction, and the vertical direction refers to a vehicle height direction. Although the following description will be given of vehicles in which the driver's seat is on the right side of the vehicle, the same applies to vehicles in which the driver's seat is on the left side of the vehicle, except that the driver's seat and passenger seat positions are swapped.

First Embodiment

With reference to FIGS. 1 to 7, a first embodiment will be described.

In a vehicle, a driver status monitoring system including Driver Status Monitor (registered trademark) (hereinafter, also referred to as DSM) is mounted as an occupant status monitoring system that monitors the conditions of occupants. The driver status monitoring system includes an imaging unit that captures images of an area around the headrest of the driver's seat, and an illumination unit that illuminates an area around the headrest of the driver's seat. The driver status monitoring system uses the imaging unit to capture images of an area around the driver's face illuminated with light while the driver is seated in the driver's seat, and analyzes the driver's facial images included in the captured images to thereby monitor the driver's condition.

The driver status monitoring system detects, from the facial images, the degree of eyelid closure, the degree of pupil dilation, the gaze direction, the gaze movement speed, and the like to determine the driver's looking aside, eye closure, drowsiness, and the like, and, based on the determination results, determines whether the driver is in a suitable or unsuitable condition for driving. When the driver status monitoring system determines that the driver is in an unsuitable condition for driving, it may activate the emergency driving stop system (EDSS) or disable autonomous driving level 3, for example.

In a passenger compartment 1, a driver's seat 2 and a passenger seat 3 are arranged side by side in the horizontal direction. A front window shield 4 is disposed in front of the driver's seat 2 and the passenger seat 3, and an instrument panel 5 extending in the horizontal direction is disposed under the front window shield 4. The instrument panel 5 has an aperture (not shown) in front of the driver's seat 2, and a column shaft (not shown) to which a steering wheel 6 is rotatably assembled is inserted through the aperture. The instrument panel 5 further has an aperture in the center part in the horizontal direction, that is, in front of and between the driver's seat 2 and the passenger seat 3, and a display device 7 is fitted into the aperture. That is, the display device 7 is assembled under an upper surface 5a of the instrument panel 5.

The display device 7 may include, for example, a display area 8 that displays various screens such as a navigation screen and an audio screen, and an outer frame 9 surrounding the left, right, top and bottom of the display area 8. The display area 8 includes a flat display such as a liquid crystal display or an organic EL (Electro-Luminescence) display, and a touch panel is provided on the front surface of the flat display. When the display device 7 detects a touch operation on the touch panel by the driver or passenger, it performs screen control such as switching the screen or displaying an icon on the screen in response to the touch operation.

The outer frame 9 holds the left, right, top and bottom edges of the display area 8 while serving as a decorative board that hides the outer periphery of the display area 8. The outer frame 9 is composed of a driver's seat side outer frame 10 extending in the vertical direction on the driver's seat side, a passenger seat side outer frame 11 extending in the vertical direction on the passenger seat side, an upper outer frame 12 extending in the horizontal direction on the upper side, and a lower outer frame 13 extending in the horizontal direction on the lower side.

In the driver's seat side outer frame 10, one illumination unit 15 and one camera 16, which are components of the driver imaging device 14, are arranged in the vertical direction. The illumination unit 15 is disposed on the upper side, and the camera 16 is disposed on the lower side. The driver imaging device 14 corresponds to an occupant imaging device, and the camera 16 corresponds to an imaging unit. The illumination unit 15 includes a light emitting element such as an LED or a vertical cavity surface emitting laser (VCSEL).

The illumination unit 15 emits light toward the area around the headrest of a seat where an occupant to be imaged is seated. The light emitted from the illumination unit 15 is near-infrared light. The illumination unit 15 is controlled to emit light depending on the brightness of the imaging environment while a shutter of the camera 16 is open. The camera 16 captures images of the area around the headrest of a seat where an occupant to be imaged is seated. The camera 16 includes a camera lens and an image sensor that converts incident light focused by the camera lens into electrical signals. Examples of the image sensor include a CCD (Charge Coupled Device) and a CMOS (Complementary Metal Oxide Semiconductor) image sensor.

An aperture (not shown) is formed in front of each of the illumination unit 15 and the camera 16, and the aperture is provided with a transmission film (not shown) that transmits the wavelength of the illumination light. The transmission film transmits light emitted from the illumination unit 15 while protecting the light-emitting surface of the illumination unit 15 and the camera lens from contact, dirt, and the like. The transmission film in front of the illumination unit 15 may have transmittance lower than that of the transmission film in front of the camera 16. Further, a light shielding member (not shown) is provided between the illumination unit 15 and the camera 16 so that light emitted from the illumination unit 15 is prevented from directly entering the camera 16.

In the configuration of this embodiment, in which the illumination unit 15 and the camera 16 are closely arranged, there is almost no angular difference between the optical axes of the illumination unit 15 and the camera 16. Since light emitted from the illumination unit 15 is reflected on the retina of the driver's eye into a direction toward the camera 16 and the light reflected by the retina directly enters the camera 16, a red-eye effect may occur. However, even if the red-eye effect occurs, the influence of the red-eye effect can be eliminated at the stage of image processing.

Next, the illumination range of the illumination unit 15 and the imaging range of the camera 16 will be described. The camera 16 used may be either a camera with a relatively narrow imaging range (hereinafter, referred to as a narrow-angle camera) or a camera with a relatively wide imaging range (hereinafter, referred to as a wide-angle camera). Both the narrow-angle camera and the wide-angle camera have the horizontal angle of view of 180° or less. The following description will be given of a case where either a narrow-angle camera or a wide-angle camera is used as the camera 16.

(1) When Camera 16 is Narrow-Angle Camera

Figure 2:
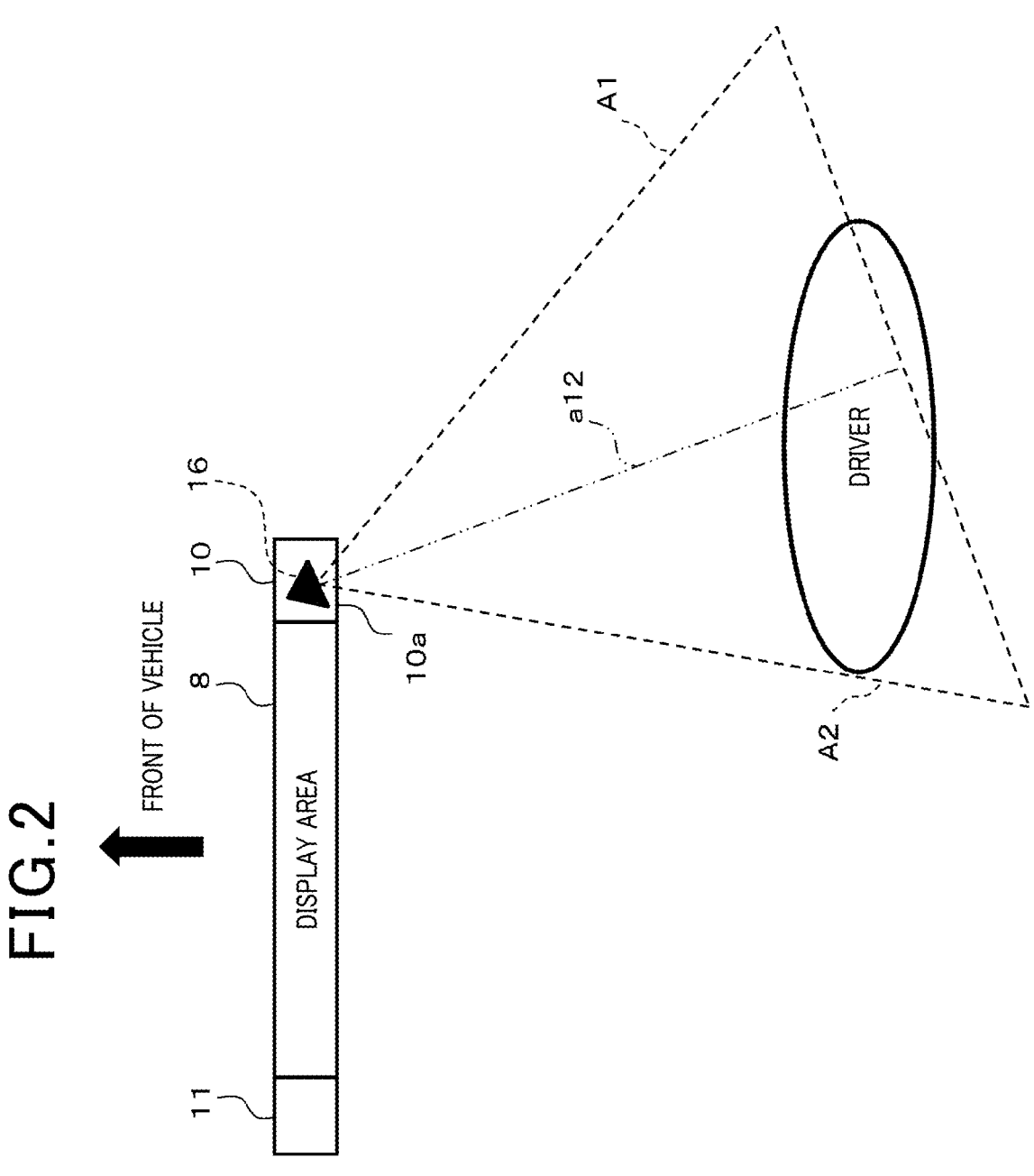
FIG. 2 is a schematic diagram illustrating an illumination range of an illumination unit and an imaging range of a camera.

When the camera 16 is a narrow-angle camera, the only occupant to be imaged is the driver. As shown in FIG. 2, the optical axes of the illumination unit 15 and the camera 16 are set to be directed toward the area around the headrest of the driver's seat. That is, while the driver is seated in the driver's seat, light emitted from the illumination unit 15 illuminates the area around the driver's face and is reflected in a direction toward the camera 16, and the camera 16 captures images of the area around the driver's face. In FIG. 2, the optical axis of the camera 16 is indicated by a12 and the imaging range of the camera 16 is indicated by A1 and A2.

Figure 3:
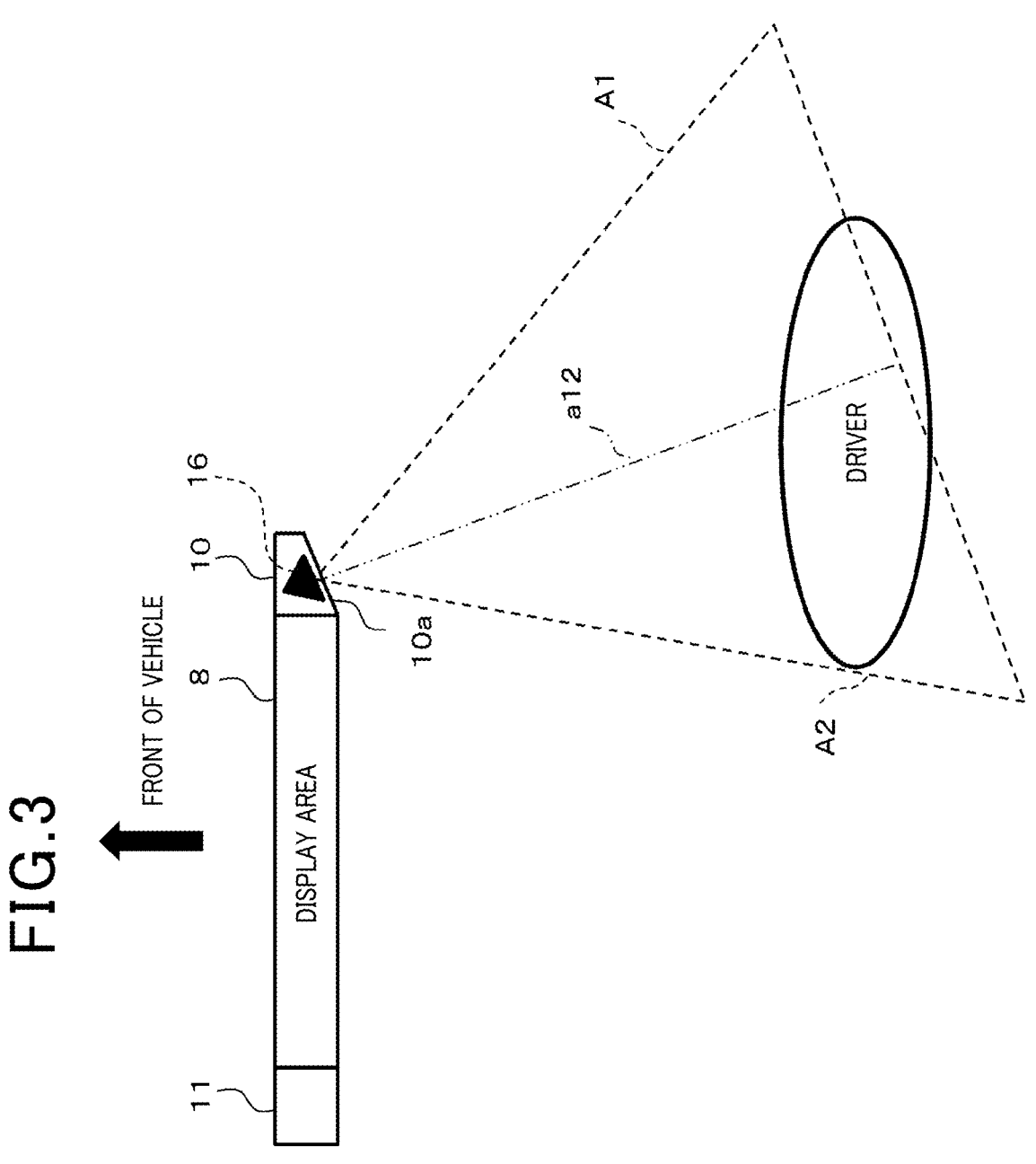
FIG. 3 is a schematic diagram illustrating an illumination range of an illumination unit and an imaging range of a camera.

In FIG. 2, there is an angular difference between a direction of the optical axis and a direction normal to a front surface 10a of the driver's seat side outer frame 10, but, as shown in FIG. 3, the front surface 10a of the driver's seat side outer frame 10 in which the illumination unit 15 and the camera 16 are disposed may be an inclined surface so that the direction of the optical axis becomes substantially the same as the direction normal to the front surface 10a of the driver's seat side outer frame 10. That is, in the configuration

7

Figure 4:
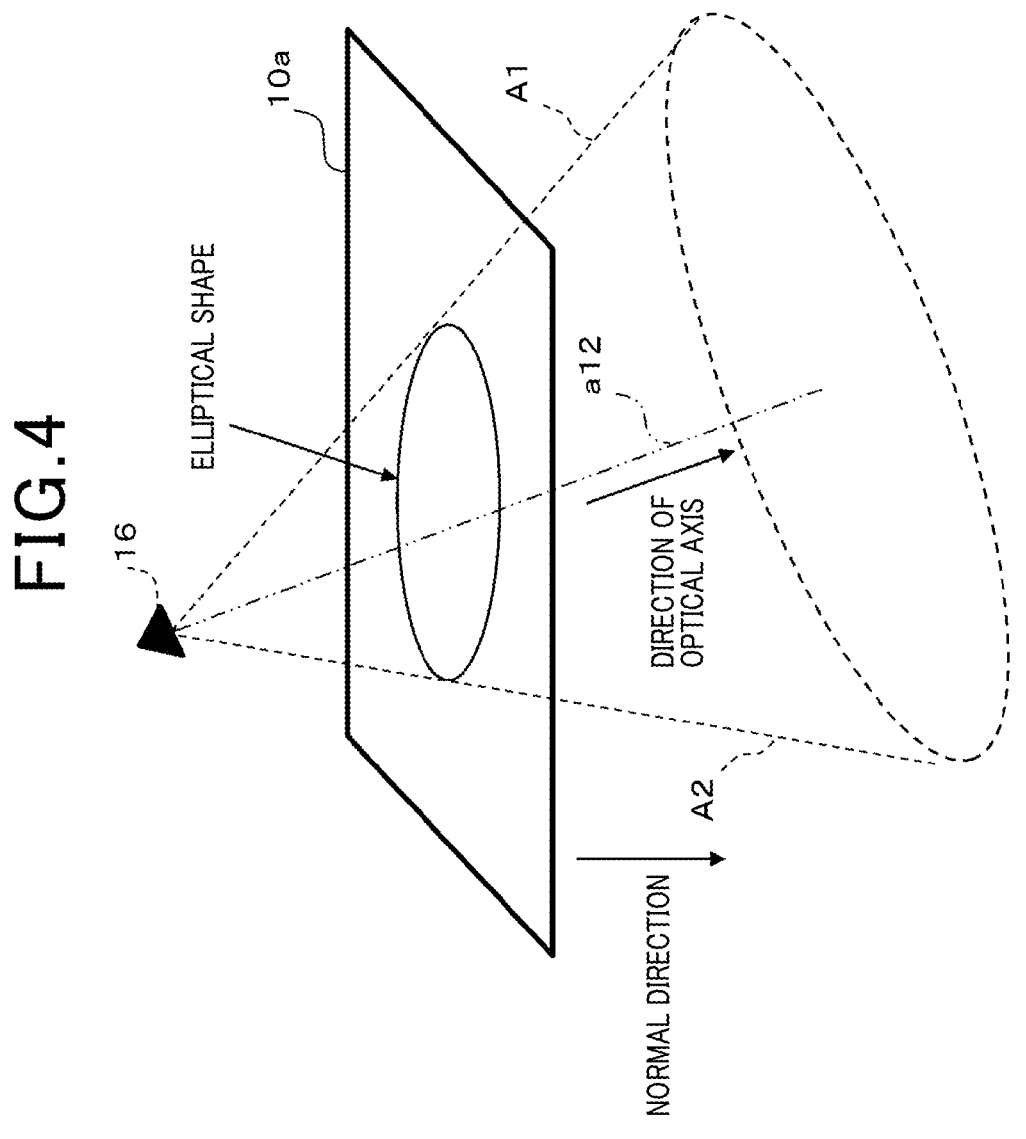
FIG. 4 is a diagram illustrating a direction of an optical axis of a camera.
Figure 5:
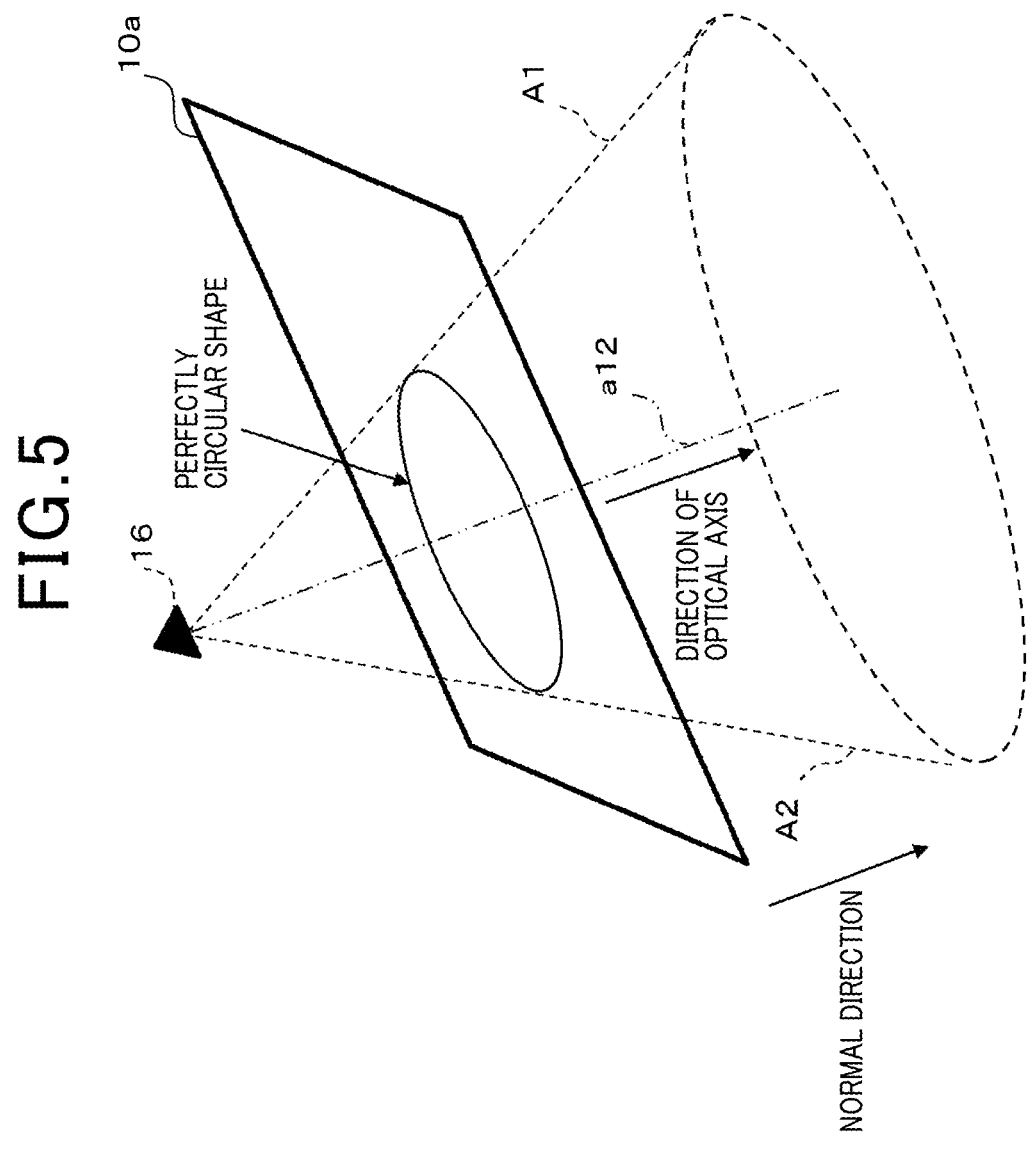
FIG. 5 is a diagram illustrating a direction of an optical axis of a camera.

8 shown in FIG. 2 in which the front surface is not inclined, the direction of the optical axis is greatly different from the direction normal to the front surface 10*a* of the driver's seat side outer frame 10. Accordingly, for example, with respect to the camera 16, the aperture in front of the camera 16 needs to be elliptical as shown in FIG. 4. On the other hand, in the configuration shown in FIG. 3 in which the front surface is inclined, the direction of the optical axis is substantially the same as the direction normal to the front surface 10*a* of the driver's seat side outer frame 10. Accordingly, the aperture in front of the camera 16 does not need to be elliptical, and can be perfectly circular as shown in FIG. 5. The same applies to the aperture in front of the illumination unit 15.

(2) When Camera 16 is Wide-Angle Camera

Figure 6:
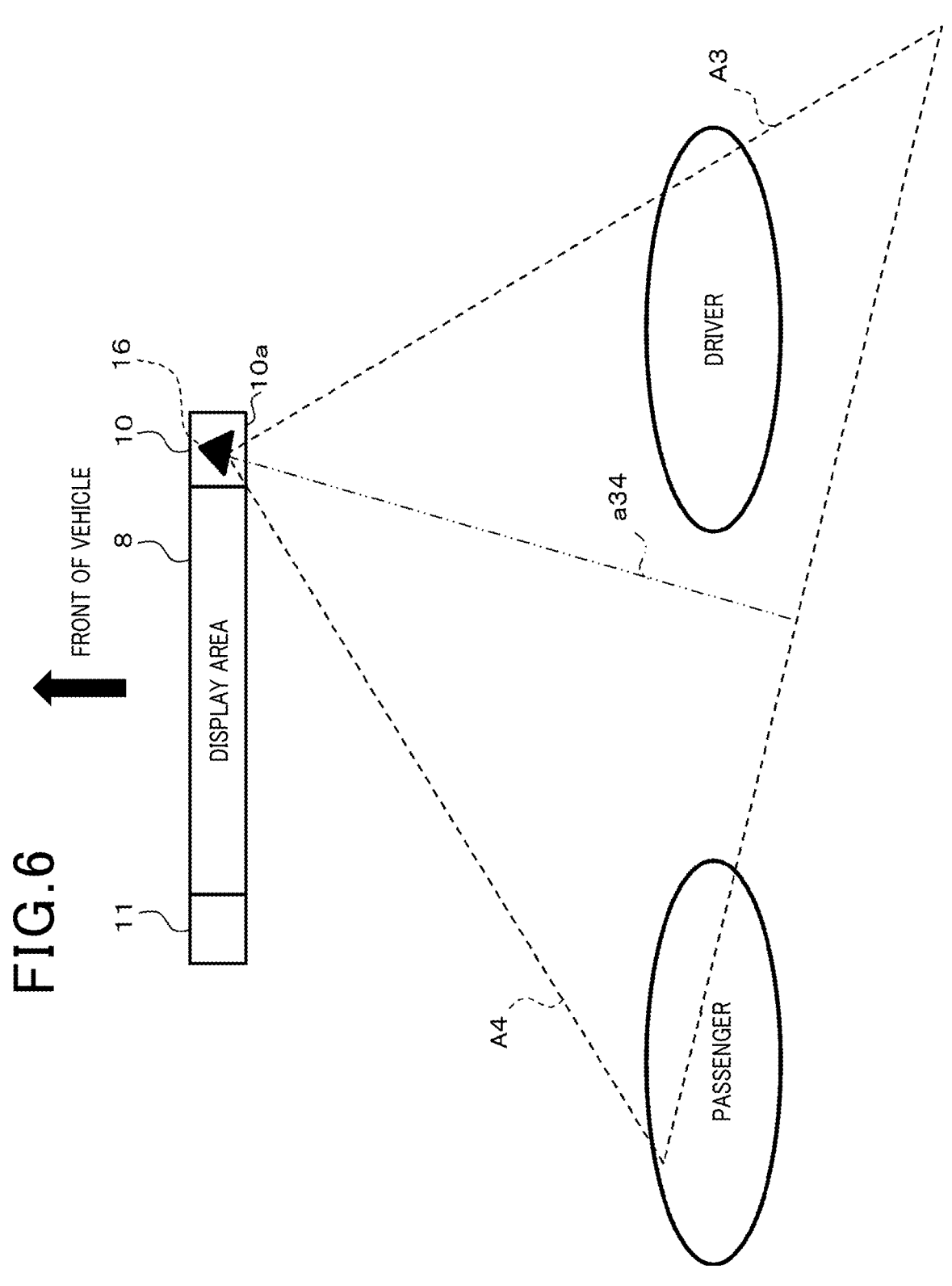
FIG. 6 is a schematic diagram illustrating an illumination range of an illumination unit and an imaging range of a camera.
Figure 7:
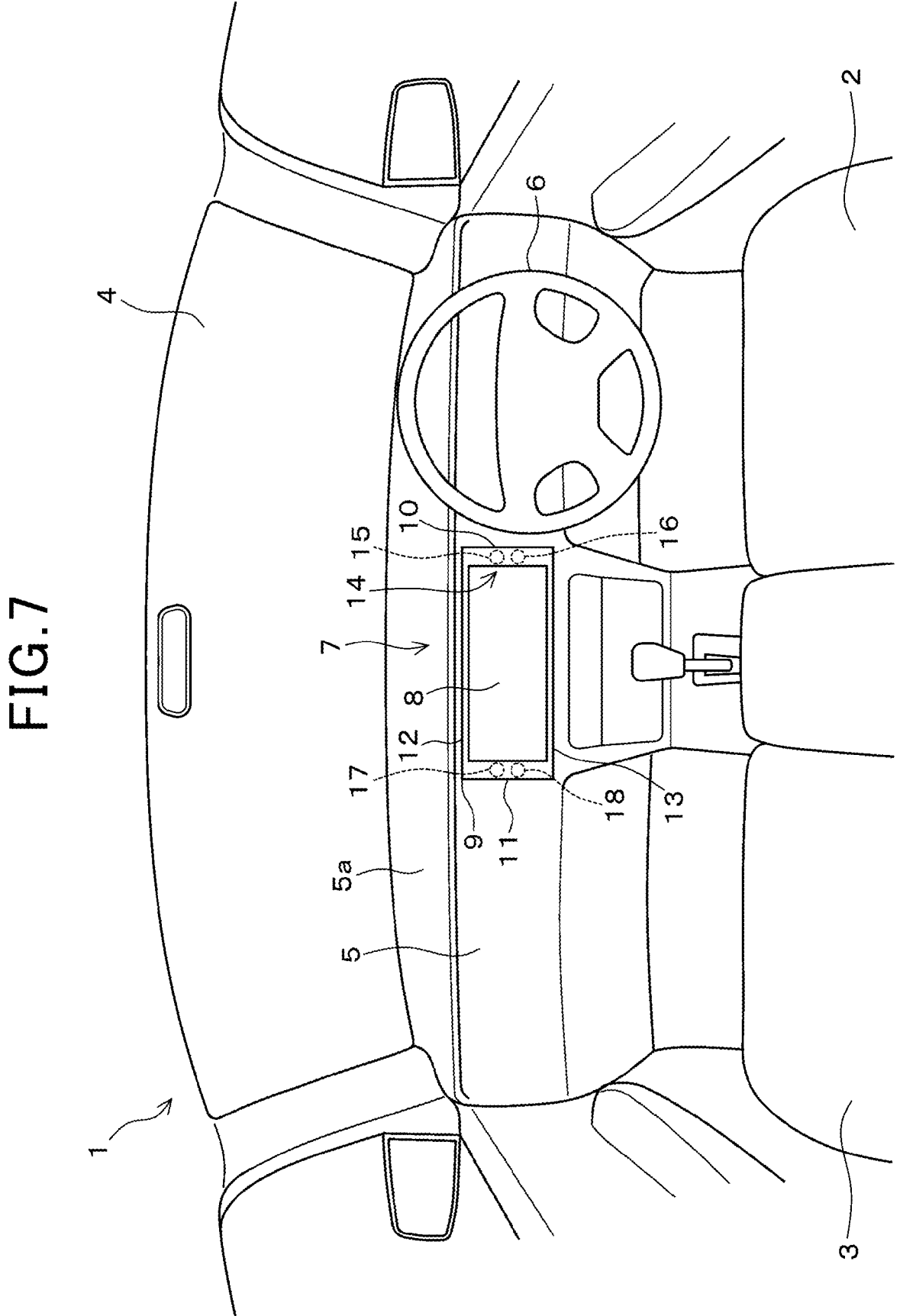
FIG. 7 is a diagram illustrating an interior of a vehicle in a second embodiment.

When the camera 16 is a wide-angle camera, the occupants to be imaged are the driver and the passenger. As shown in FIG. 6, the optical axes of the illumination unit 15 and the camera 16 are set to be directed toward an area between the headrest of the driver's seat and the headrest of the passenger seat. That is, while the driver is seated in the driver's seat and the passenger is seated in the passenger seat, light emitted from the illumination unit 15 illuminates the area around both the driver's face and the passenger's face and is reflected in a direction toward the camera 16, and the camera 16 captures images of the area around both the driver's face and the passenger's face. In FIG. 6, the optical axis of the camera 16 is indicated by a34 and the imaging range of the camera 16 is indicated by A3 and A4.

In the example described above, the illumination unit 15 is disposed on the upper side, and the camera 16 is disposed on the lower side. However, the positions of the illumination unit 15 and the camera 16 may be interchanged, and the camera 16 may be disposed on the upper side, and the illumination unit 15 may be disposed on the lower side. Further, in the example described above, one illumination unit 15 is provided. However, two or more illumination units 15 may be provided, and illumination operations of the two or more illumination units 15 may be synchronously controlled. When two illumination units 15 are provided, the optical axes of the two illumination units 15 may not necessarily be the same, and the optical axis of one of the illumination units 15 may be directed toward the driver, and the optical axis of the other of the illumination units 15 may be directed toward the passenger. In the example described above, one camera 16 is provided. However, two or more cameras 16 may be provided, and imaging operations of the two or more cameras 16 may be synchronously controlled. That is, the number and arrangement of the illumination unit 15 and the camera 16 are not limited as long as they are arranged in the vertical direction in the driver's seat side outer frame 10.

As described above, according to the first embodiment, the following effects can be achieved. The driver imaging device 14 has a configuration in which the illumination unit 15 and the camera 16 are arranged in the vertical direction in the driver's seat side outer frame 10 of the display device 7. The substrate on which the camera 16 is mounted and the substrate on which the illumination unit 15 is mounted can be common, reducing the number of parts to thereby prevent the display device 8 from increasing in size. Furthermore, the routing between the camera 16 and the illumination unit 15 can be shortened. Furthermore, the angular difference between the optical axes of the camera 16 and the illumination unit 15 can be reduced, preventing a decrease in detection accuracy in image recognition. In addition, the display device 8 can be at a minimum height, ensuring an appropriate field of vision for the driver. Thus, it is possible to prevent the display device 8 from increasing in size, prevent a decrease in detection accuracy in image recognition, shorten the routing between the camera 16 and the illumination unit 15, and ensure an appropriate field of vision for the driver.

Second Embodiment

With reference to FIGS. 7 to 10, a second embodiment will be described. In the second embodiment, the illumination unit 15 and the camera 16 are arranged in the vertical direction in the driver's seat side outer frame 10, and in addition, an illumination unit 17 and a camera 18 are arranged in the vertical direction in the passenger seat side outer frame 11. An aperture (not shown) is also formed in front of each of the illumination unit 17 and the camera 18, and the aperture is provided with a transmission film (not shown) that transmits the wavelength of the illumination light. The illumination unit 17 and the camera 18 are the same as the illumination unit 15 and the camera 16, respectively, described in the first embodiment. That is, the number and arrangement of the illumination unit 17 and the camera 18 are not limited as long as they are arranged in the vertical direction in the passenger seat side outer frame 11.

In this case as well, either a narrow-angle camera or a wide-angle camera is used as the cameras 16 and 18. The following description will be given of a case where either a narrow-angle camera or a wide-angle camera is used as the cameras 16 and 18.

(1) When Both Cameras 16 and 18 are Narrow-Angle Cameras

Figure 8:
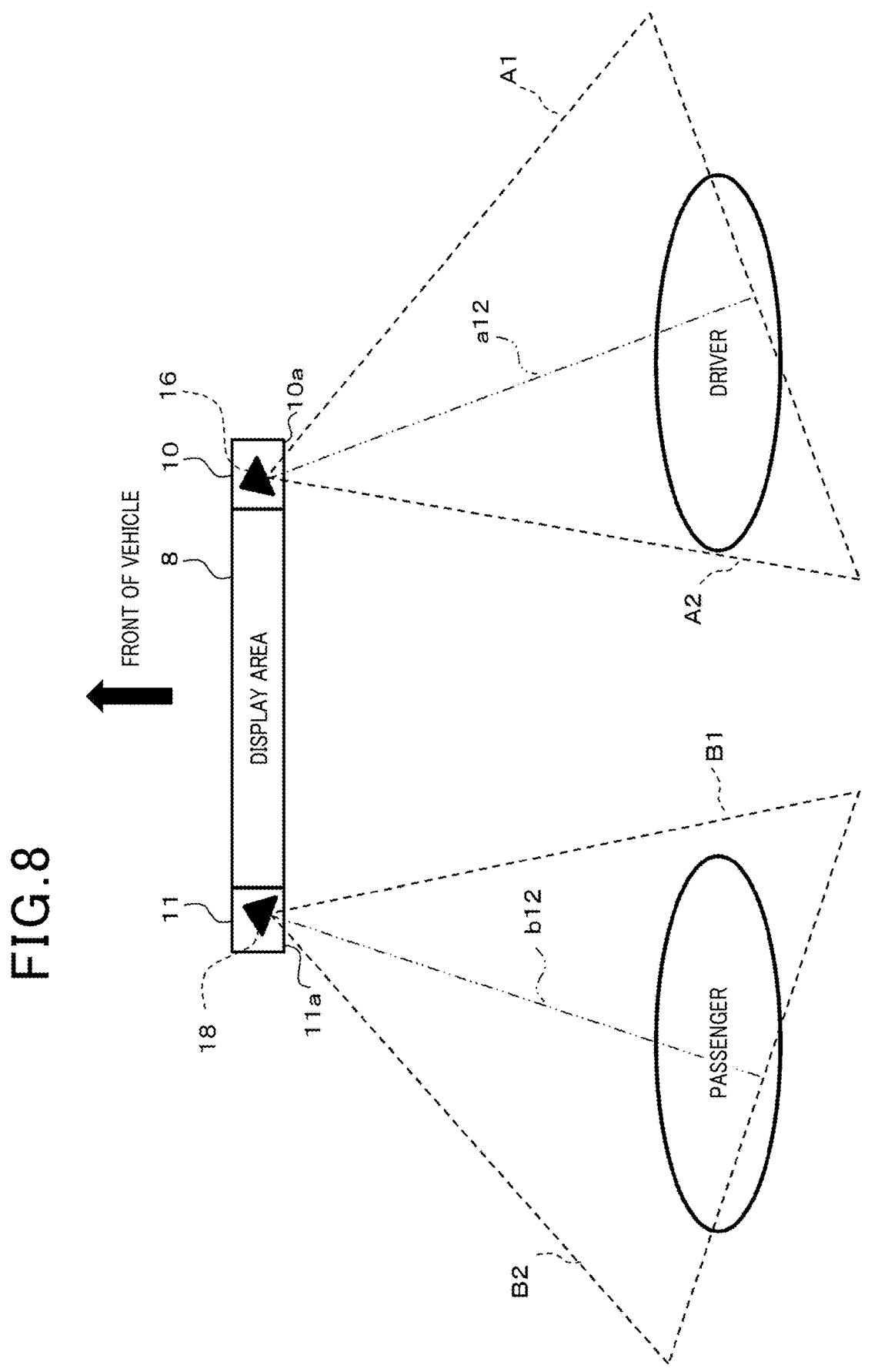
FIG. 8 is a schematic diagram illustrating an illumination range of an illumination unit and an imaging range of a camera.

When both the cameras 16 and 18 are narrow-angle cameras, the occupants to be imaged are the driver and the passenger. As shown in FIG. 8, the optical axes of the illumination unit 15 and the camera 16 are set to be directed toward the area around the headrest of the driver's seat. The optical axes of the illumination unit 17 and the camera 18 are set to be directed toward the area around the headrest of the passenger seat. That is, while the driver is seated in the driver's seat, light emitted from the illumination unit 15 illuminates the area around the driver's face and is reflected in a direction toward the camera 16, and the camera 16 captures images of the area around the driver's face. Also, while the passenger is seated in the passenger seat, light emitted from the illumination unit 17 illuminates the area around the passenger's face and is reflected in a direction toward the camera 18, and the camera 18 captures images of the area around the passenger's face. In FIG. 8, the optical axis of the camera 16 is indicated by a12 and the imaging range of the camera 16 is indicated by A1 and A2, while the optical axis of the camera 18 is indicated by b12 and the imaging range of the camera 18 is indicated by B1 and B2. In this case, as with the configuration described in the first embodiment, in which the front surface 10*a* of the driver's seat side outer frame 10 in which the illumination unit 15 and the camera 16 are disposed is an inclined surface, a front surface 11*a* of the passenger seat side outer frame 11 in which the illumination unit 17 and the camera 18 are disposed may also be an inclined surface so that a direction of the optical axis becomes substantially the same as a direction normal to the front surface 11*a* of the passenger seat side outer frame 11.

(2) When Camera 16 is Narrow-Angle Camera and Camera 18 is Wide-Angle Camera When the camera 16 is a narrow-angle camera and the camera 18 is a wide-angle camera, the occupants to be imaged are the driver and the passenger. As shown in FIG.

Figure 9:
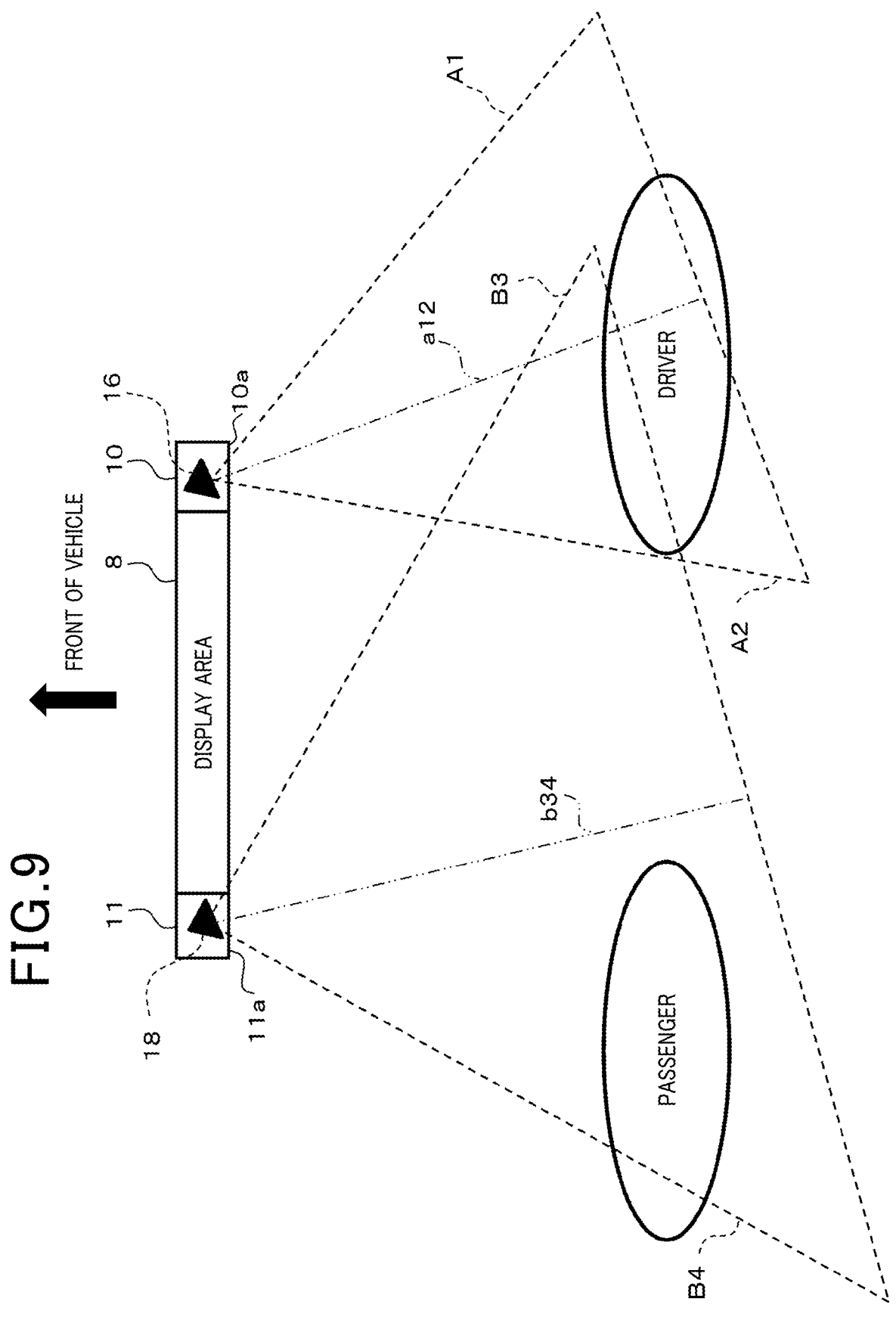
FIG. 9 is a schematic diagram illustrating an illumination range of an illumination unit and an imaging range of a camera.

9, the optical axes of the illumination unit 15 and the camera 16 are set to be directed toward the area around the headrest of the driver's seat. The optical axes of the illumination unit 17 and the camera 18 are set to be directed toward an area between the headrest of the driver's seat and the headrest of the passenger seat. In FIG. 9, the optical axis of the camera 16 is indicated by a12 and the imaging range of the camera 16 is indicated by A1 and A2, and the optical axis of the camera 18 is indicated by b34 and the imaging range of the camera 18 is indicated by B3 and B4. In addition, imaging operations of the camera 16 and the camera 18 may be synchronously controlled. Further, two illumination units 17 may be provided with the optical axis of one of the illumination units 17 being directed toward the driver and the optical axis of the other of the illumination units 17 being directed toward the passenger so that both the light emitted from the illumination unit 17 directed toward the driver and the light emitted from the illumination unit 15 illuminate the driver. This configuration can decrease the intensity of the illumination unit 15, reducing power consumption and heat generation.

(3) When Both Cameras 16 and 18 are Wide-Angle Cameras

Figure 10:
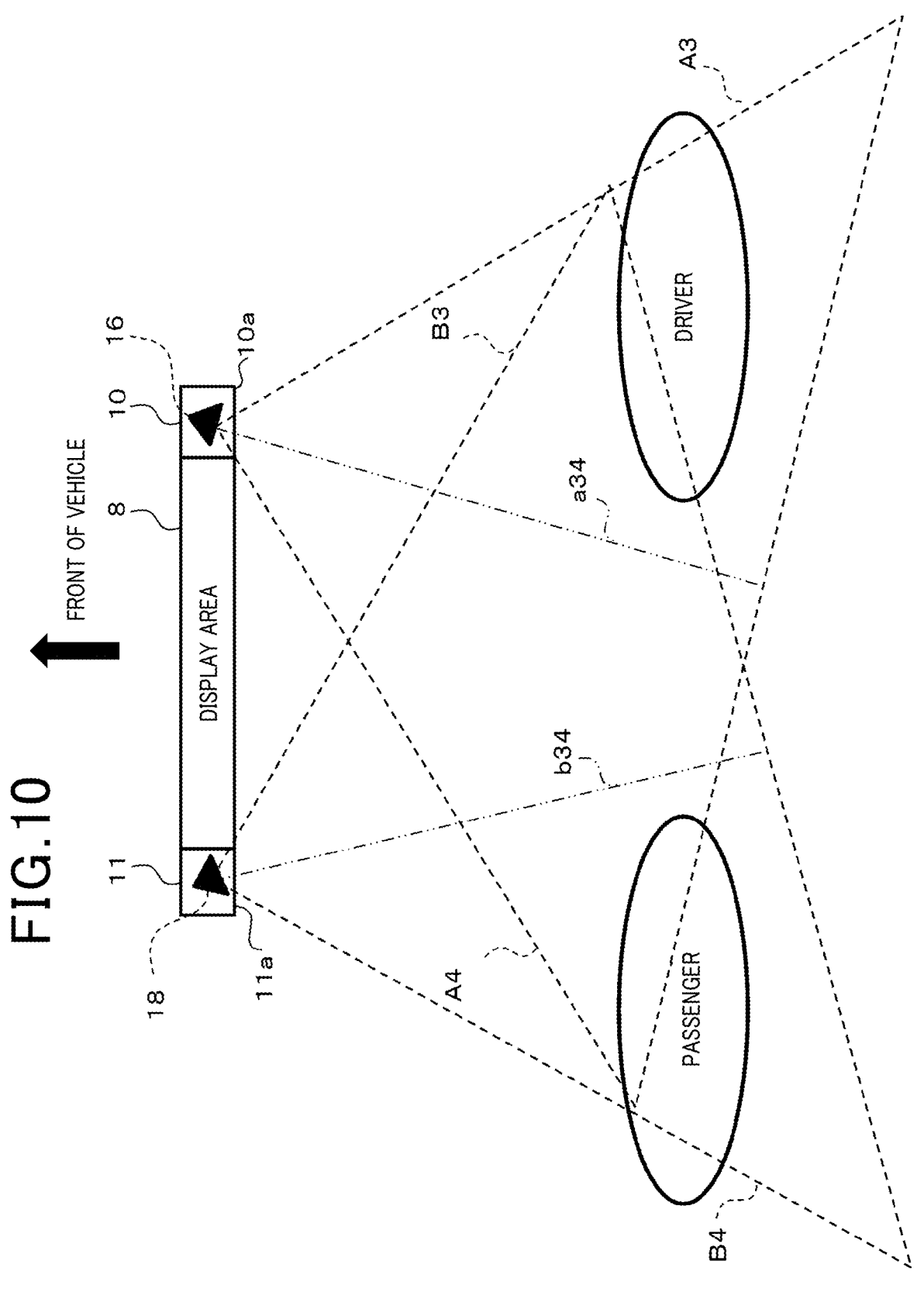
FIG. 10 is a schematic diagram illustrating an illumination range of an illumination unit and an imaging range of a camera.

When both the cameras 16 and 18 are wide-angle cameras, the occupants to be imaged are the driver and the passenger. As shown in FIG. 10, the optical axes of the illumination units 15 and 17 and the cameras 16 and 18 are set to be directed toward an area between the headrest of the driver's seat and the headrest of the passenger seat. In FIG. 10, the optical axis of the camera 16 is indicated by a34 and the imaging range of the camera 16 is indicated by A3 and A4, and the optical axis of the camera 18 is indicated by b34 and the imaging range of the camera 18 is indicated by B3 and B4.

According to the second embodiment, the driver imaging device 14 has a configuration in which the illumination unit 15 and the camera 16 are arranged in the vertical direction in the driver's seat side outer frame 10 of the display device 7, and in addition, the illumination unit 17 and the camera 18 are arranged in the vertical direction in the passenger seat side outer frame 11 of the display device 7. In addition to the driver's condition, the passenger's condition can be appropriately monitored.

Third Embodiment

Figure 11:
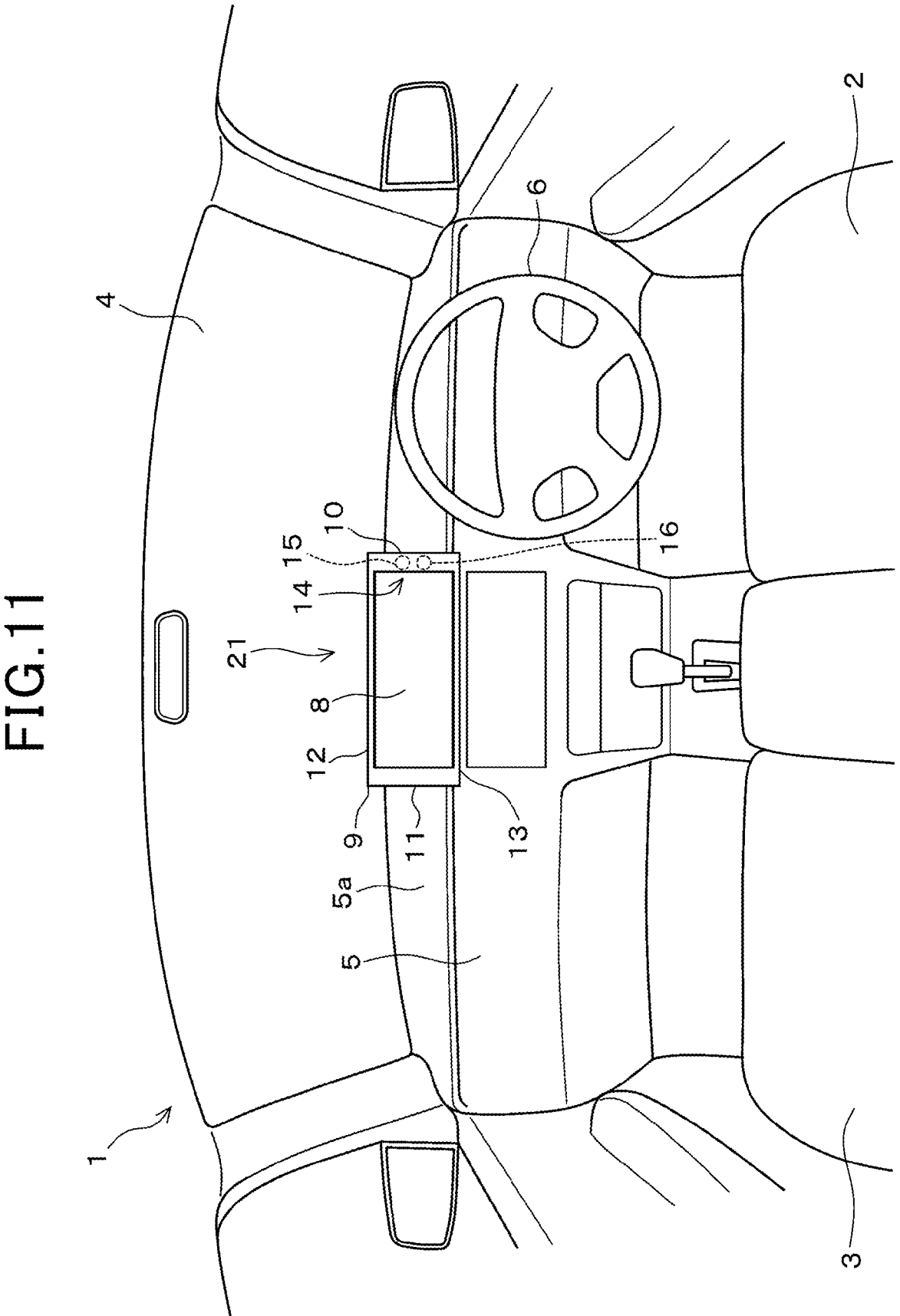
FIG. 11 is a diagram illustrating an interior of a vehicle in a third embodiment.

With reference to FIG. 11, a third embodiment will be described. Although the first and second embodiments have a configuration in which the display device 7 is assembled under the upper surface 5a of the instrument panel 5, the third embodiment has a configuration in which a display device 21 is assembled in a manner that it stands on the upper surface 5a of the instrument panel 5. The display device 21 differs from the display device 7 described in the first embodiment in the position. The display device 21, as with the display device 7, includes the display area 8 and the outer frame 9 surrounding the left, right, top and bottom of the display area 8, and the illumination unit 15 and the camera 16 are arranged in the vertical direction in the driver's seat side outer frame 10. The illumination range of the illumination unit 15 and the imaging range of the camera 16 are the same as those in the first embodiment. Further, when the illumination unit 15 and the camera 16 are arranged in the vertical direction in the driver's seat side outer frame 10 while the illumination unit 17 and the camera 18 are arranged in the vertical direction in the passenger seat side outer frame 11, the illumination ranges of the illumination units 15 and 17 and the imaging ranges of the cameras 16 and 18 are the same as those in the second embodiment.

According to the third embodiment, even when the display device 21 is assembled above the upper surface 5a of the instrument panel 5, the same effect as in the first embodiment can be achieved as long as the illumination unit 15 and the camera 16 are arranged in the vertical direction in the driver's seat side outer frame 10. Further, in the configuration in which the illumination unit 15 and the camera 16 are arranged in the vertical direction in the driver's seat side outer frame 10 while an illumination unit 17 and a camera 18 are arranged in the vertical direction in the passenger seat side outer frame 11, the same effect as in the second embodiment can be achieved.

Fourth Embodiment

Figure 12:
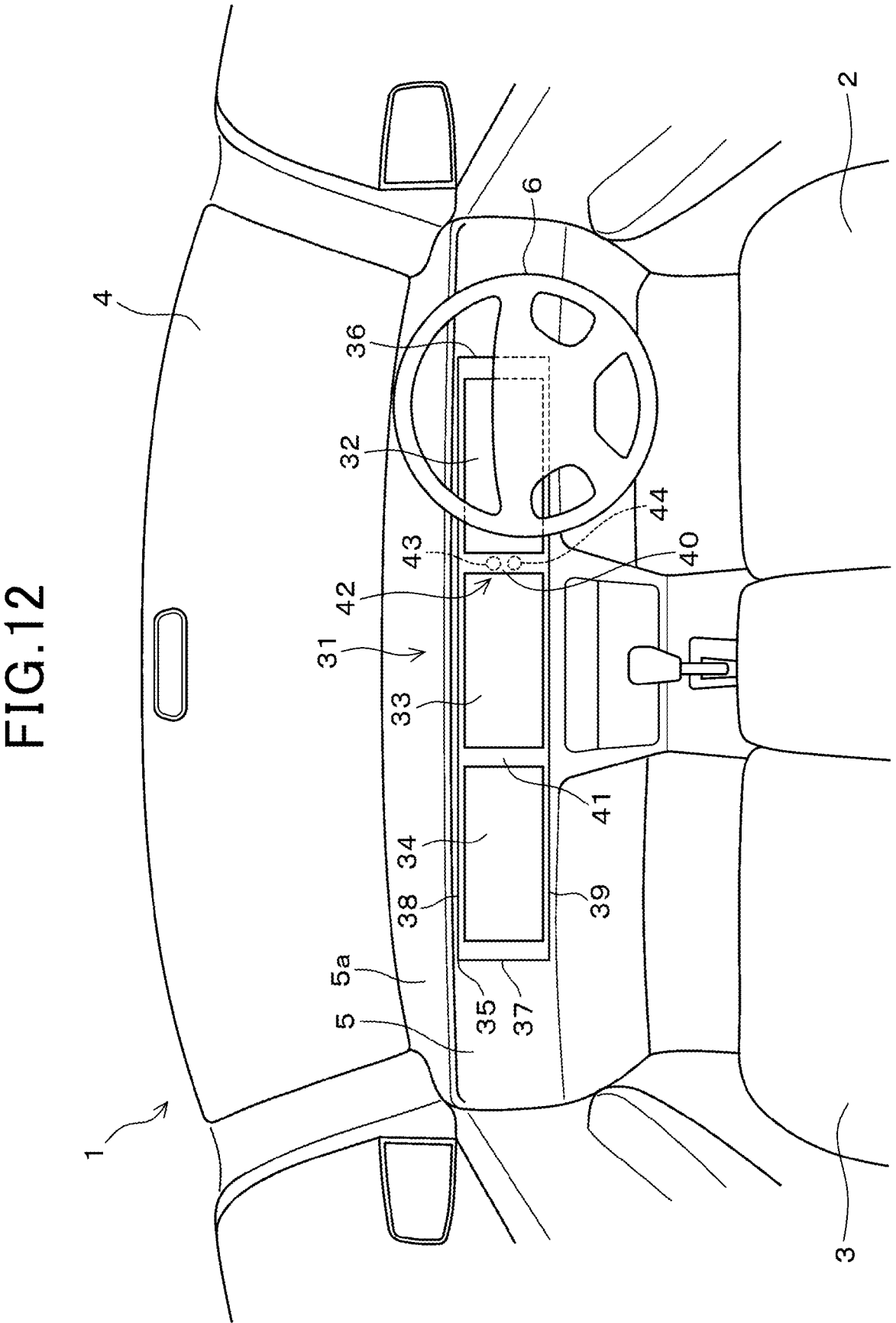
FIG. 12 is a diagram illustrating an interior of a vehicle in a fourth embodiment.
Figure 13:
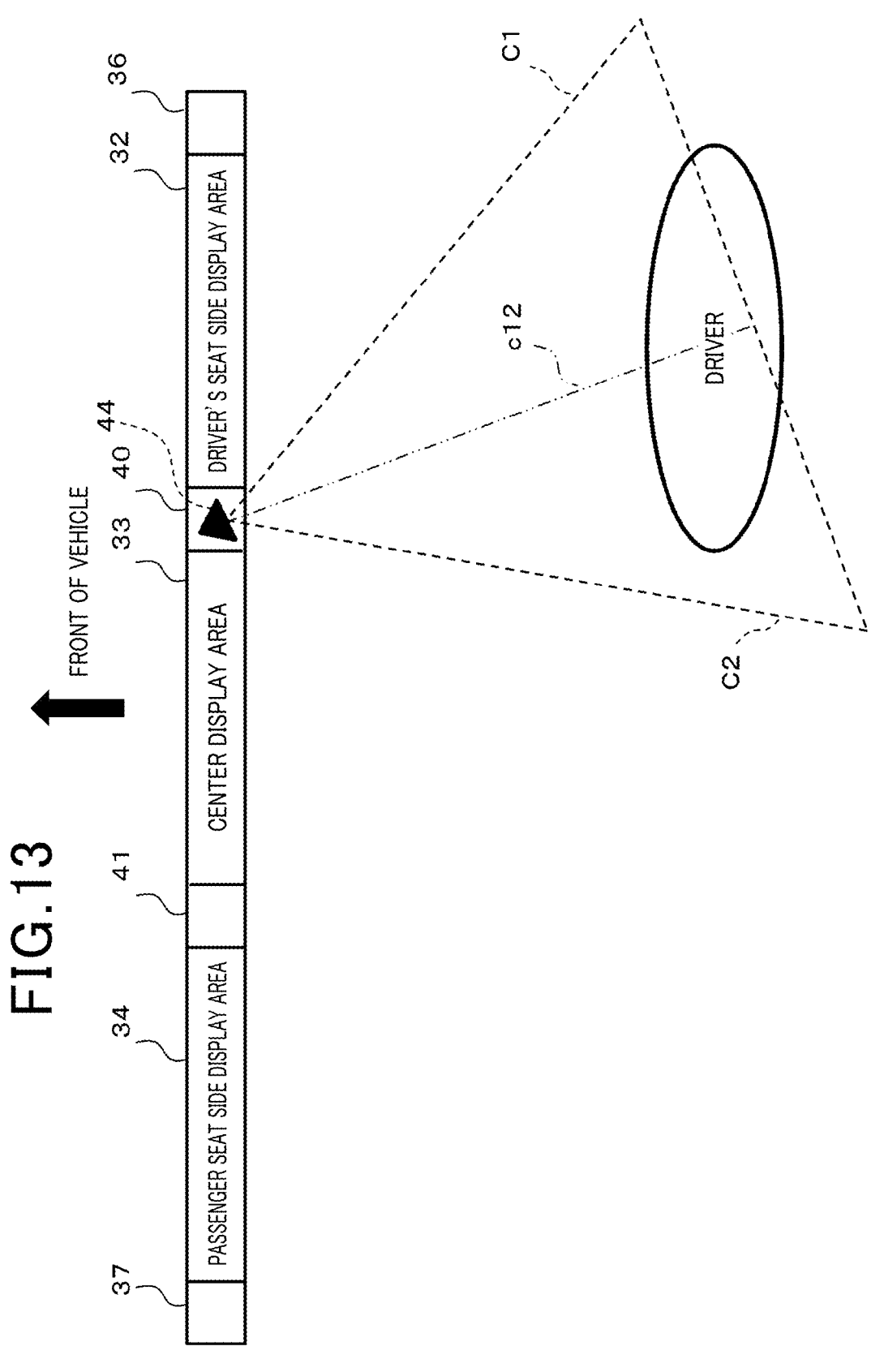
FIG. 13 is a schematic diagram illustrating an illumination range of an illumination unit and an imaging range of a camera.
Figure 14:
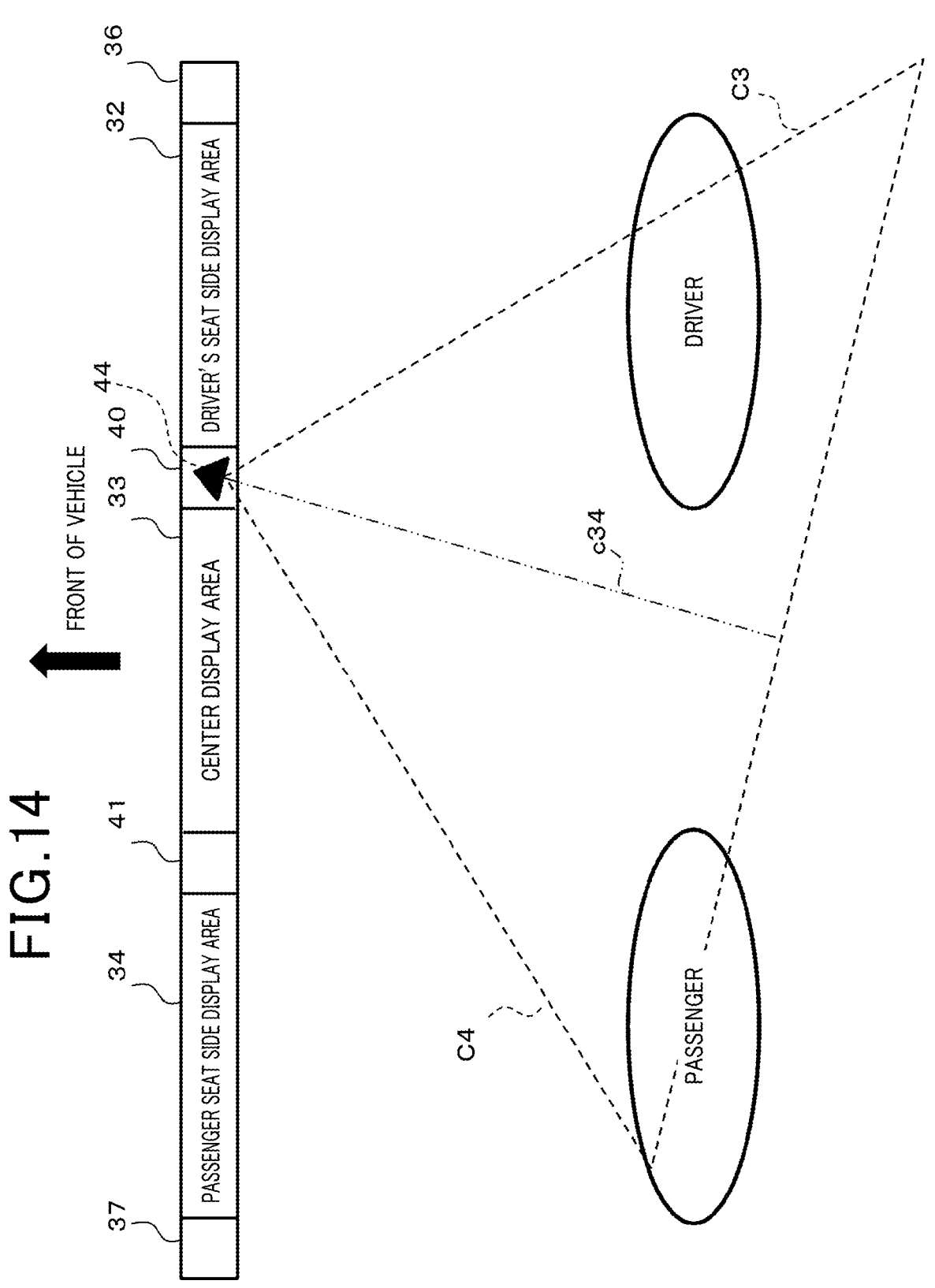
FIG. 14 is a schematic diagram illustrating an illumination range of an illumination unit and an imaging range of a camera.

With reference to FIGS. 12 to 14, a fourth embodiment will be described. The fourth embodiment differs from the first embodiment in the configuration of the display device. A display device 31 includes three display areas 32 to 34 arranged side by side in the horizontal direction, and an outer frame 35 surrounding the left, right, top and bottom of the three display areas 32 to 34. The driver's seat side display area 32 is disposed in front of the driver's seat 2, the center display area 33 is disposed in front of and between the driver's seat 2 and the passenger seat 3, and the passenger seat side display area 34 is disposed in front of the passenger seat 3. The number of display areas arranged in the horizontal direction may be two, or may be four or more.

The outer frame 35 holds the left, right, top and bottom edges of the display areas 32 to 34 while serving as a decorative board that hides the outer periphery of the display areas 32 to 34. The outer frame 35 is composed of a driver's seat side outer frame 36 extending in the vertical direction on the driver's seat side, a passenger seat side outer frame 37 extending in the vertical direction on the passenger seat side, an upper outer frame 38 extending in the horizontal direction on the upper side, a lower outer frame 39 extending in the horizontal direction on the lower side, a first connecting section 40 that connects the driver's seat side display area 32 to the center display area 33, and a second connecting section 41 that connects the passenger seat side display area 34 to the center display area 33.

In the first connecting section 40, one illumination unit 43 and one camera 44, which are components of the driver imaging device 42, are arranged in the vertical direction. An aperture (not shown) is also formed in front of each of the illumination unit 43 and the camera 44, and the aperture is provided with a transmission film (not shown) that transmits the wavelength of the illumination light. The illumination unit 43 and the camera 44 are the same as the illumination unit 15 and the camera 16, respectively, described in the first embodiment. That is, the number and arrangement of the illumination unit 43 and the camera 44 are not limited as long as they are arranged in the vertical direction in the first connecting section 40.

In this case as well, either a narrow-angle camera or a wide-angle camera is used as the camera 44. The following description will be given of a case where either a narrow-angle camera or a wide-angle camera is used as the camera 44.

(1) When Camera 44 is Narrow-Angle Camera

When the camera 44 is a narrow-angle camera, the only occupant to be imaged is the driver. As shown in FIG. 13, the optical axes of the illumination unit 43 and the camera 44 are set to be directed toward the area around the headrest of the driver's seat. That is, while the driver is seated in the driver's seat, light emitted from the illumination unit 43 illuminates the area around the driver's face and is reflected in a direction toward the camera 44, and the camera 44 captures images of the area around the driver's face. In FIG. 13, the optical axis of the camera 44 is indicated by c12 and the imaging range of the camera 44 is indicated by C1 and C2.

(2) When Camera 44 is Wide-Angle Camera

When the camera 44 is a wide-angle camera, the occupants to be imaged are the driver and the passenger. As shown in FIG. 14, the optical axes of the illumination unit 43 and the camera 44 are set to be directed toward an area between the headrest of the driver's seat and the headrest of the passenger seat. That is, while the driver is seated in the driver's seat and the passenger is seated in the passenger seat, light emitted from the illumination unit 43 illuminates the area around both the driver's face and the passenger's face and is reflected in a direction toward the camera 44, and the camera 44 captures images of the area around both the driver's face and the passenger's face. In FIG. 14, the optical axis of the camera 44 is indicated by c34 and the imaging range of the camera 44 is indicated by C3 and C4.

According to the fourth embodiment, the driver imaging device 42 has a configuration in which the illumination unit 43 and the camera 44 are arranged in the vertical direction in the first connecting section 40 of the display device 31. The substrate on which the camera 44 is mounted and the substrate on which the illumination unit 43 is mounted can be common, reducing the number of parts to thereby prevent the display device 31 from increasing in size. Furthermore, the routing between the camera 44 and the illumination unit 43 can be shortened. Furthermore, the angular difference between the optical axes of the camera 44 and the illumination unit 43 can be reduced, preventing a decrease in detection accuracy in image recognition. In addition, the display device 31 can be at a minimum height, ensuring an appropriate field of vision for the driver. Thus, it is possible to prevent the display device 31 from increasing in size, prevent a decrease in detection accuracy in image recognition, shorten the routing between the camera 44 and the illumination unit 43, and ensure an appropriate field of vision for the driver.

Fifth Embodiment

With reference to FIGS. 15 to 18, a fifth embodiment will be described. In the fifth embodiment, the illumination unit 43 and the camera 44 are arranged in the vertical direction in the first connecting section 40, and in addition, an illumination unit 45 and a camera 46 are arranged in the vertical direction in the second connecting section 41. An aperture (not shown) is also formed in front of each of the illumination unit 45 and the camera 46, and the aperture is provided with a transmission film (not shown) that transmits the wavelength of the illumination light. The illumination unit 45 and the camera 46 are the same as the illumination unit 15 and the camera 16, respectively, described in the first embodiment. That is, the number and arrangement of the illumination unit 45 and the camera 46 are not limited as long as they are arranged in the vertical direction in the second connecting section 41.

In this case as well, either a narrow-angle camera or a wide-angle camera is used as the cameras 44 and 46. The following description will be given of a case where either a narrow-angle camera or a wide-angle camera is used as the cameras 44 and 46.

(1) When Both Cameras 44 and 46 are Narrow-Angle Cameras

Figure 16:
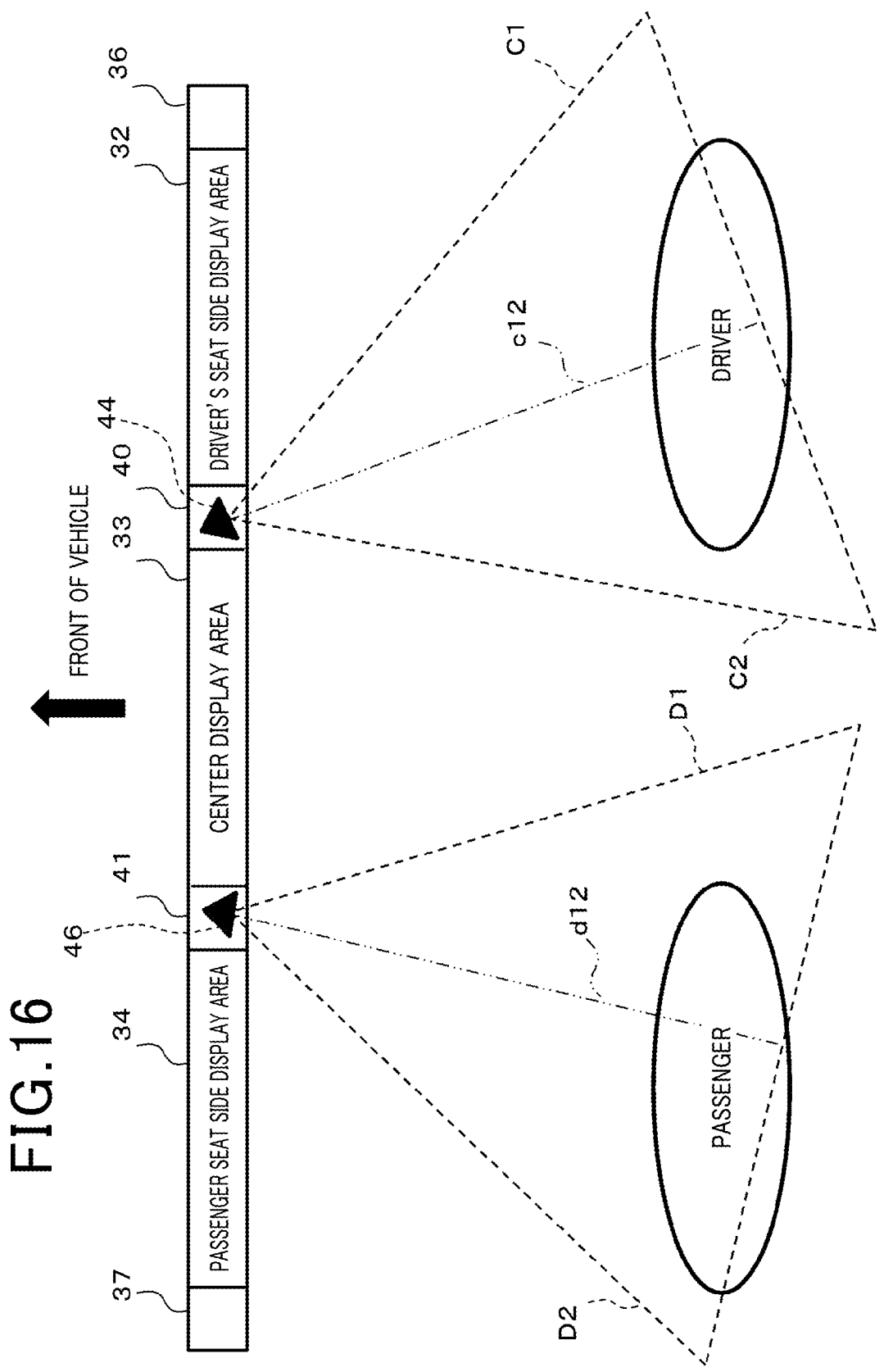
FIG. 16 is a schematic diagram illustrating an illumination range of an illumination unit and an imaging range of a camera.

When both the cameras 44 and 46 are narrow-angle cameras, the occupants to be imaged are the driver and the passenger. As shown in FIG. 16, the optical axes of the illumination unit 43 and the camera 44 are set to be directed toward the area around the headrest of the driver's seat. The optical axes of the illumination unit 45 and the camera 46 are set to be directed toward the area around the headrest of the passenger seat. In FIG. 16, the optical axis of the camera 44 is indicated by c12 and the imaging range of the camera 44 is indicated by C1 and C2, and the optical axis of the camera 46 is indicated by d12 and the imaging range of the camera 46 is indicated by D1 and D2.

Figure 17:
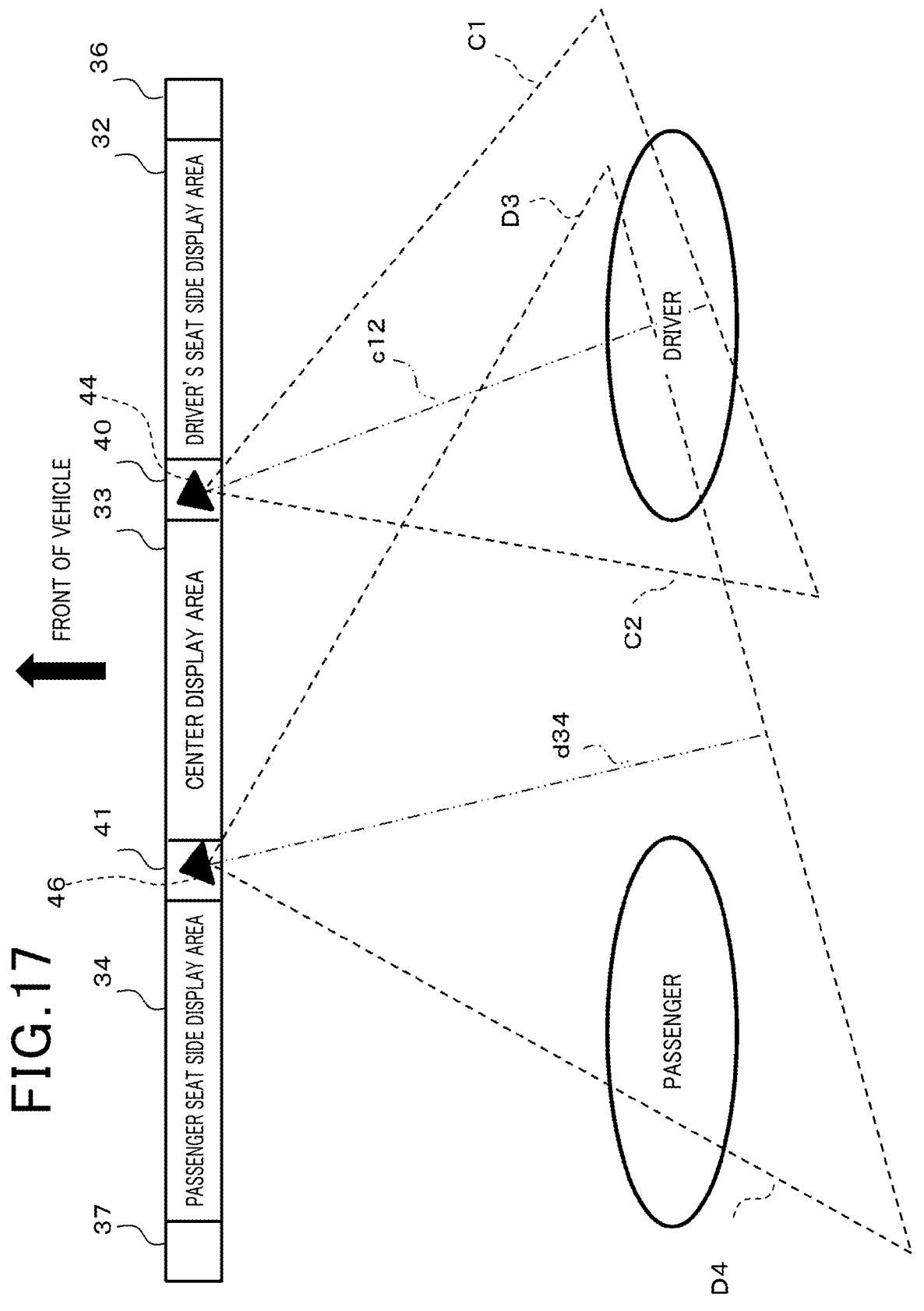
FIG. 17 is a schematic diagram illustrating an illumination range of an illumination unit and an imaging range of a camera.

(2) When Camera 44 is Narrow-Angle Camera and Camera 46 is Wide-Angle Camera When the camera 44 is a narrow-angle camera and the camera 46 is a wide-angle camera, the occupants to be imaged are the driver and the passenger. As shown in FIG. 17, the optical axes of the illumination unit 43 and the camera 44 are set to be directed toward the area around the headrest of the driver's seat. The optical axes of the illumination unit 45 and the camera 46 are set to be directed toward an area between the headrest of the driver's seat and the headrest of the passenger seat. In FIG. 17, the optical axis of the camera 44 is indicated by c12 and the imaging range of the camera 44 is indicated by C1 and C2, and the optical axis of the camera 46 is indicated by d34 and the imaging range of the camera 46 is indicated by D3 and D4.

(3) When Both Cameras 44 and 46 are Wide-Angle Cameras

Figure 18:
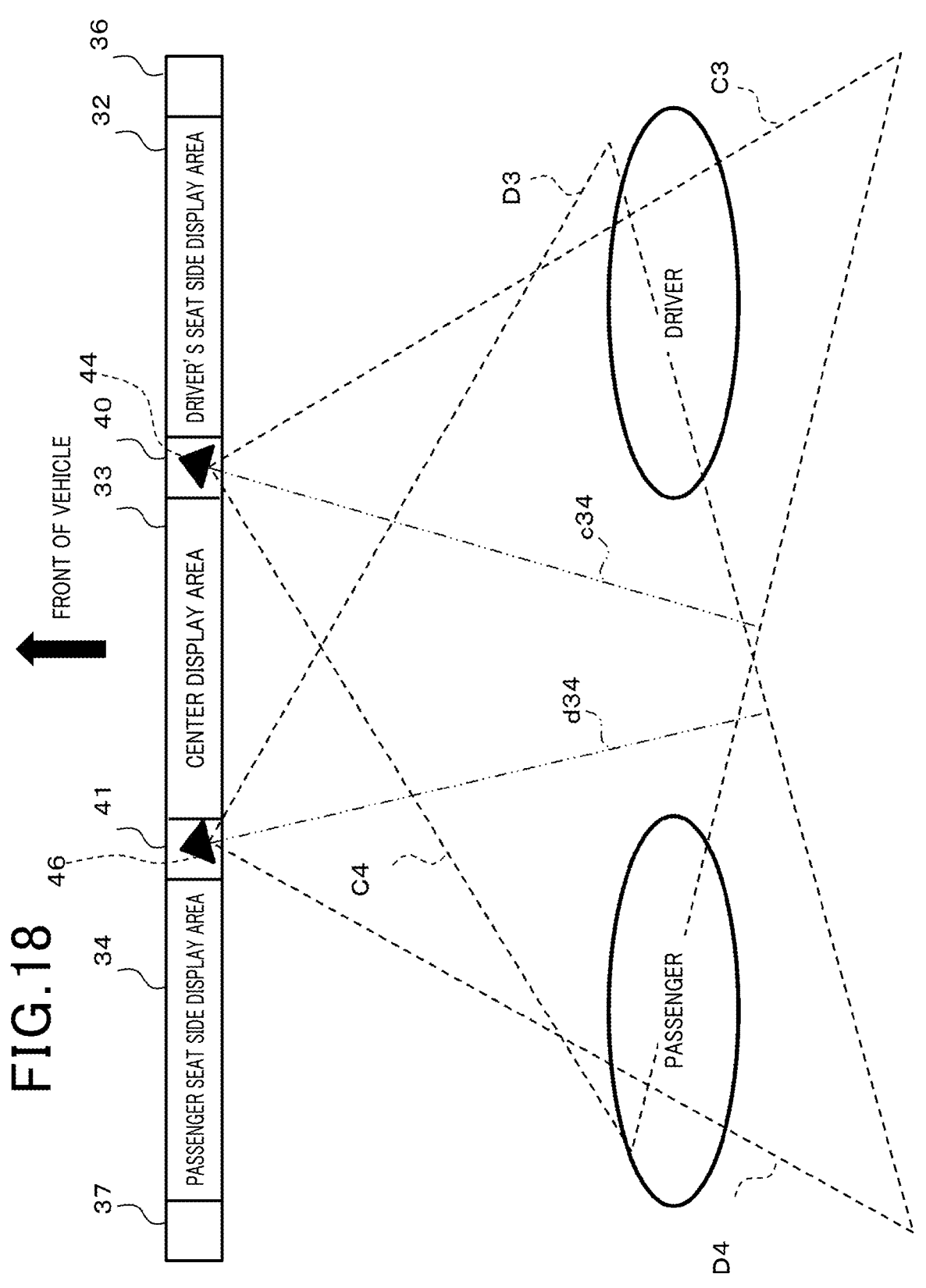
FIG. 18 is a schematic diagram illustrating an illumination range of an illumination unit and an imaging range of a camera.

When both the cameras 44 and 46 are wide-angle cameras, the occupants to be imaged are the driver and the passenger. As shown in FIG. 18, the optical axes of the illumination units 43 and 45 and the cameras 44 and 46 are set to be directed toward an area between the headrest of the driver's seat and the headrest of the passenger seat. In FIG. 18, the optical axis of the camera 44 is indicated by c34 and the imaging range of the camera 44 is indicated by C3 and C4, and the optical axis of the camera 46 is indicated by d34 and the imaging range of the camera 46 is indicated by D3 and D4.

According to the fifth embodiment, the driver imaging device 42 has a configuration in which the illumination unit 43 and the camera 44 are arranged in the vertical direction in the first connecting section 40 of the display device 31, and in addition, the illumination unit 45 and the camera 46 are arranged in the vertical direction in the second connecting section 41 of the display device 31. In addition to the driver's condition, the passenger's condition can be appropriately monitored.

Sixth Embodiment

Figure 19:
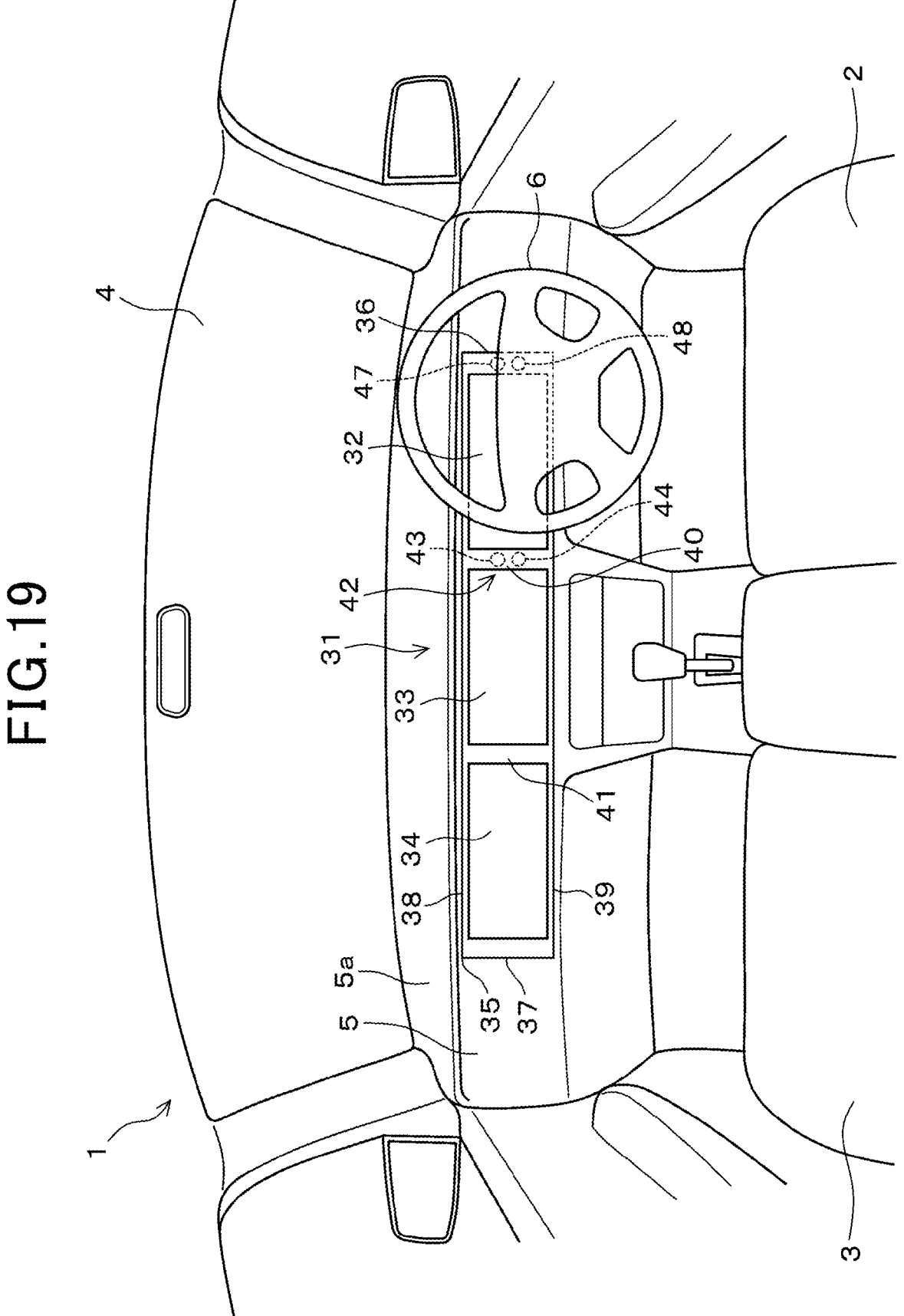
FIG. 19 is a diagram illustrating an interior of a vehicle in a sixth embodiment.
Figure 20:
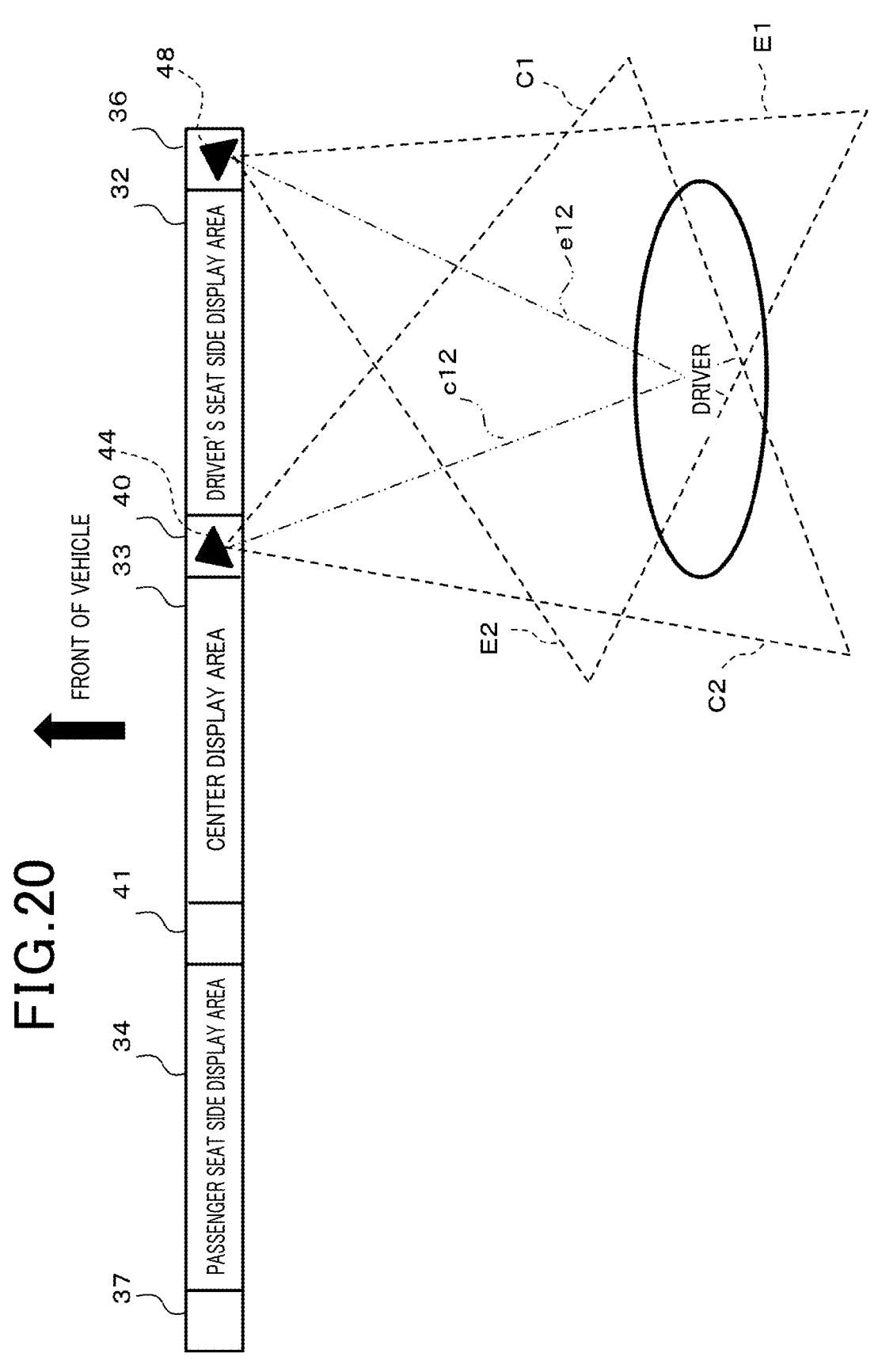
FIG. 20 is a schematic diagram illustrating an illumination range of an illumination unit and an imaging range of a camera.
Figure 21:
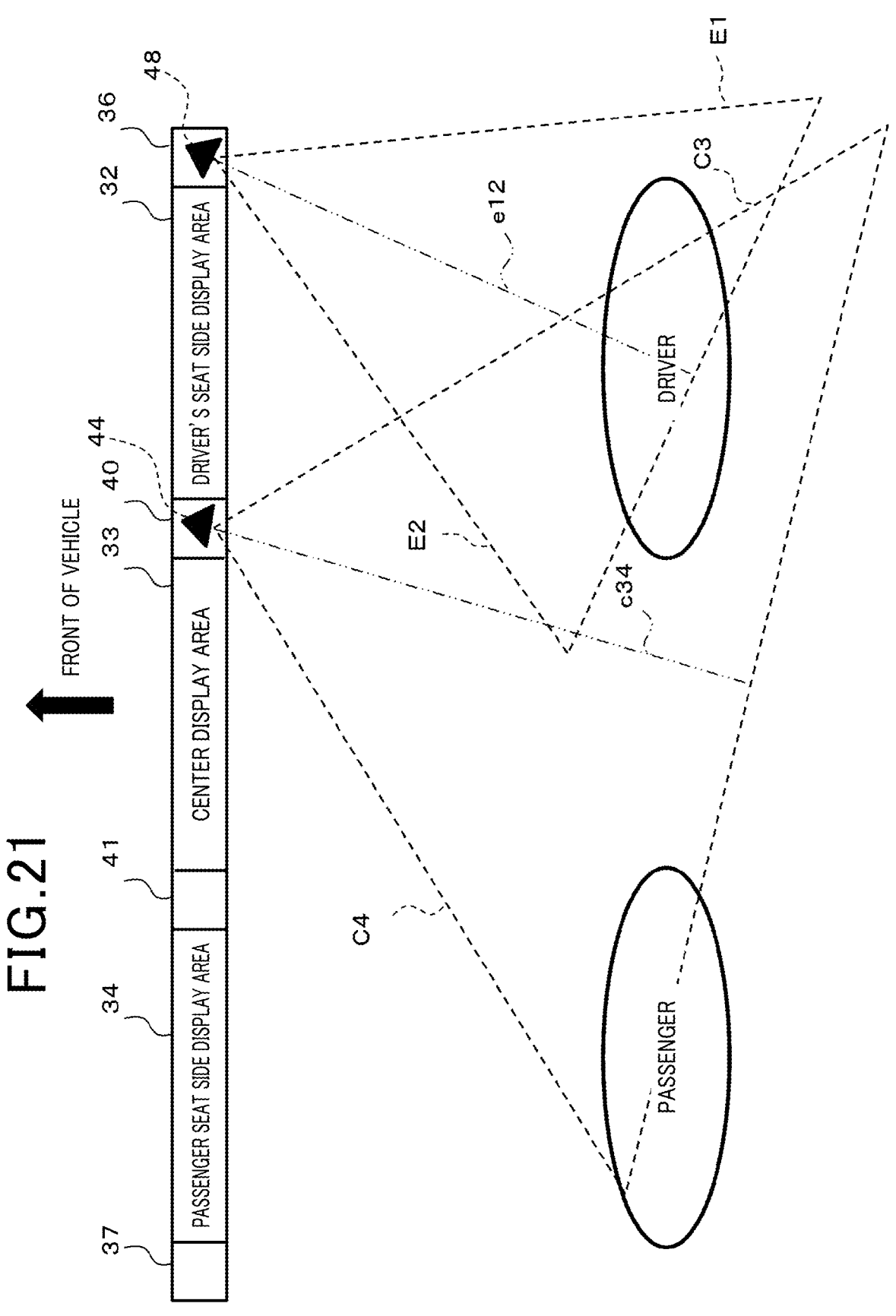
FIG. 21 is a schematic diagram illustrating an illumination range of an illumination unit and an imaging range of a camera.

With reference to FIGS. 19 to 21, a sixth embodiment will be described. In the sixth embodiment, the illumination unit 43 and the camera 44 are arranged in the vertical direction in the first connecting section 40, and in addition, an illumination unit 47 and a camera 48 are arranged in the vertical direction in the driver's seat side outer frame 36. An aperture (not shown) is also formed in front of each of the illumination unit 47 and the camera 48, and the aperture is provided with a transmission film (not shown) that transmits the wavelength of the illumination light. The illumination unit 47 and the camera 48 are the same as the illumination unit 15 and the camera 16, respectively, described in the first embodiment. That is, the number and arrangement of the illumination unit 47 and the camera 48 are not limited as long as they are arranged in the vertical direction in the driver's seat side outer frame 36.

In this case, either a narrow-angle camera or a wide-angle camera is used as the camera 44, and a narrow-angle camera is used as the camera 48. The following description will be given of a case where either a narrow-angle camera or a wide-angle camera is used as the camera 44 and a narrow-angle camera is used as the camera 48.

(1) When Both Cameras 44 and 48 are Narrow-Angle Cameras

When both the cameras 44 and 48 are narrow-angle cameras, the only occupant to be imaged is the driver. As shown in FIG. 20, the optical axes of the illumination units 43 and 47 and the cameras 44 and 48 are set to be directed toward the area around the headrest of the driver's seat. That is, while the driver is seated in the driver's seat, light emitted from the illumination units 43 and 47 illuminates the area around the driver's face and is reflected in a direction toward the cameras 44 and 48, and the cameras 44 and 48 capture images of the area around the driver's face. In FIG. 20, the optical axis of the camera 44 is indicated by c12 and the imaging range of the camera 44 is indicated by C1 and C2, and the optical axis of the camera 48 is indicated by e12 and the imaging range of the camera 48 is indicated by E1 and E2.

(2) When Camera 44 is Wide-Angle Camera and Camera 48 is Narrow-Angle Camera

When the camera 44 is a wide-angle camera and the camera 48 is a narrow-angle camera, the occupants to be imaged are the driver and the passenger. As shown in FIG. 21, the optical axes of the illumination unit 43 and the camera 44 are set to be directed toward an area between the headrest of the driver's seat and the headrest of the passenger seat. The optical axes of the illumination unit 47 and the camera 48 are set to be directed toward the area around the headrest of the driver's seat. In FIG. 21, the optical axis of the camera 44 is indicated by c34 and the imaging range of the camera 44 is indicated by C3 and C4, and the optical axis of the camera 48 is indicated by e12 and the imaging range of the camera 48 is indicated by E1 and E2.

According to the sixth embodiment, the driver imaging device 42 has a configuration in which the illumination unit 43 and the camera 44 are arranged in the vertical direction in the first connecting section 40 of the display device 31, and in addition, the illumination unit 47 and the camera 48 are arranged in the vertical direction in the driver's seat side outer frame 36 of the display device 31. In addition to the driver's condition, the passenger's condition can be appropriately monitored.

The fourth embodiment has been described as having the configuration in which the illumination unit 43 and the camera 44 are disposed only in the first connecting section 40, the fifth embodiment has been described as having the configuration in which the illumination unit 43 and the camera 44 are disposed in the first connecting section 40 while the illumination unit 45 and the camera 46 are disposed in the second connecting section 41, and the sixth embodiment has been described as having the configuration in which the illumination unit 43 and the camera 44 are disposed in the first connecting section 40 while the illumination unit 47 and the camera 48 are disposed in the driver's seat side outer frame 36. However, the illumination unit and the camera may be disposed in any combination of the first connecting section 40, the second connecting section 41, the driver's seat side outer frame 36 and the passenger seat side outer frame 37 as long as the illumination unit and the camera are disposed at least one of the first connecting section 40, the second connecting section 41 and the driver's seat side outer frame 36. That is, the illumination unit and the camera may be disposed, for example, in all the first connecting section 40, the second connecting section 41, the driver's seat side outer frame 36 and the passenger seat side outer frame 37. Furthermore, a display device having the same configuration as that of the display device 31 may be assembled in a manner that it stands on the upper surface 5a of the instrument panel 5.

Seventh Embodiment

Figure 22:
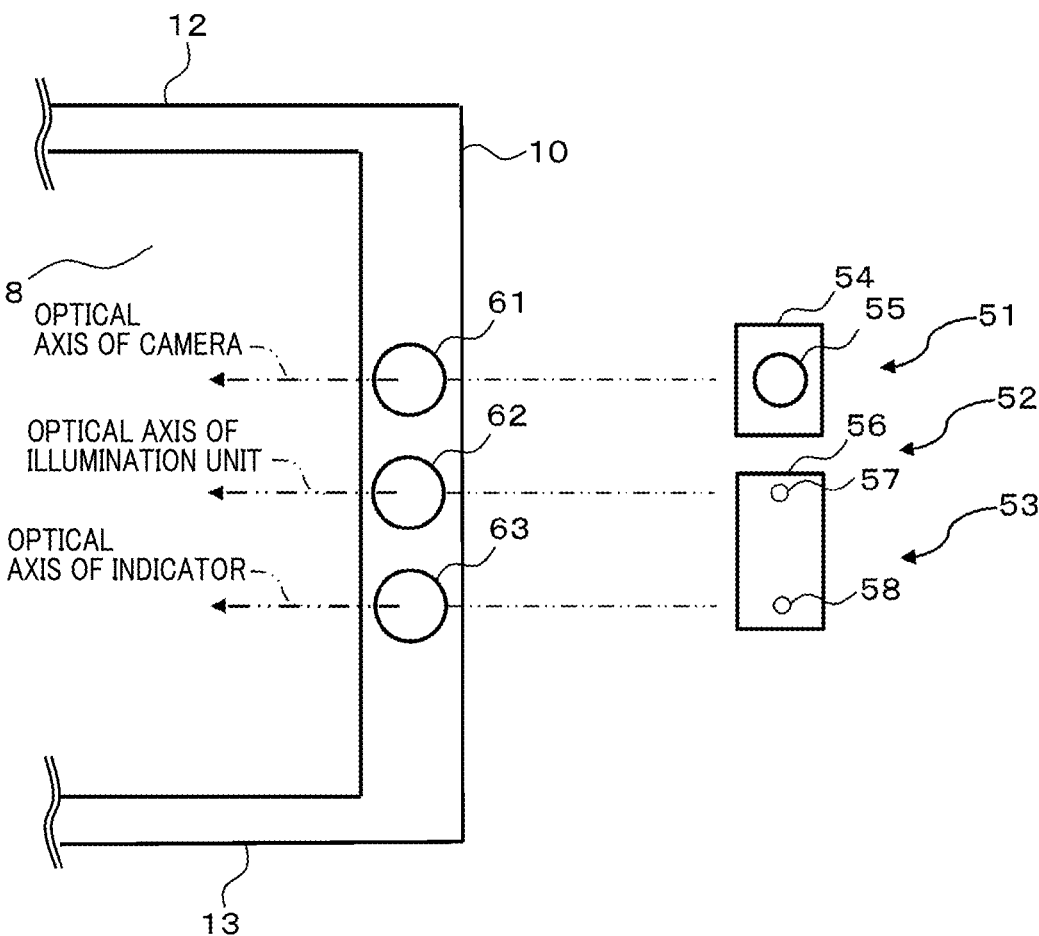
FIG. 22 is a schematic diagram illustrating a relationship between an aperture and an optical axis according to a seventh embodiment.
Figure 23:
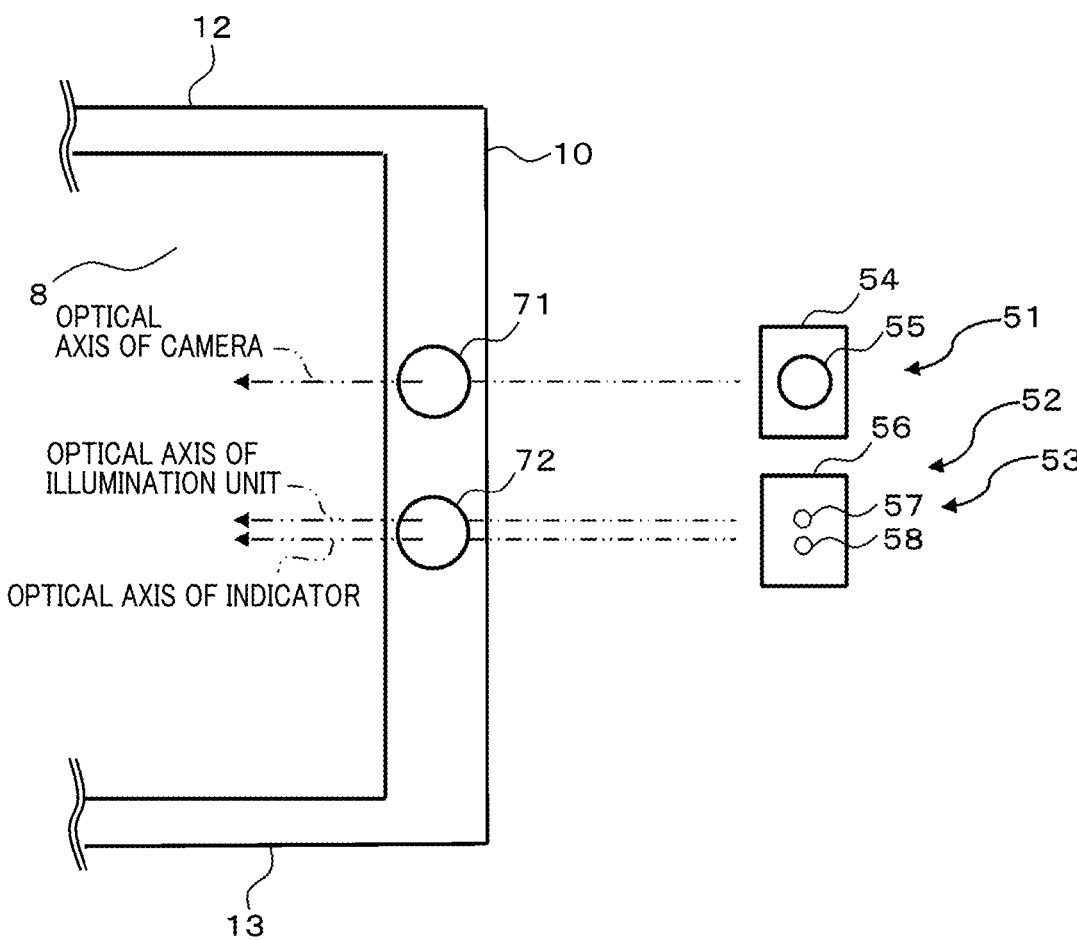
FIG. 23 is a schematic diagram illustrating a relationship between an aperture and an optical axis.

With reference to FIGS. 22 and 23, a seventh embodiment will be described. In the seventh embodiment, an indicator is disposed in addition to the illumination unit and the camera such that they are arranged in the vertical direction in the driver's seat side outer frame 10 of the outer frame 9 of the display device 7, for example. The indicator indicates whether the driver status monitoring system is enabled or disabled. That is, the indicator lights up when the illumination unit is emitting light, the camera is capturing images of the area around the occupant's face, and the driver status monitoring system is enabled. On the other hand, the indicator is off when the illumination unit is not emitting light, the camera is not capturing images of the area around the occupant's face, and the driver status monitoring system is disabled. The indicator may also be referred to as a pilot lamp or a tell-tale lamp.

For example, in the driver's seat side outer frame 10 of the display device 7 described in the first embodiment, a camera 51, an illumination unit 52 and an indicator 53 are arranged from the top to the bottom in the vertical direction as shown in FIGS. 22 and 23. An image sensor 55 of the camera 51 is mounted on a camera substrate 54, and a light emitting element 57 of the illumination unit 52 and a light emitting element 58 of the indicator 53 are arranged in the vertical direction on an illumination substrate 56.

In this case, an aperture (corresponding to a first aperture) through which light emitted from the illumination unit 52 passes and an aperture (corresponding to a second aperture) through which light emitted from the indicator 53 passes may be separately provided, or may be provided in common. The following description will be given of a case where the apertures are separately provided and a case where the apertures are provided in common.

(1) When Apertures are Separately Provided

As shown in FIG. 22, a camera aperture 61, an illumination unit aperture 62 and an indicator aperture 63 are formed in front of the image sensor 55 of the camera 51, the light emitting element 57 of the illumination unit 52 and the light emitting element 58 of the indicator 53, respectively, in the driver's seat side outer frame 10. The respective apertures 61 to 63 are provided with a transmission film (not shown) that transmits the wavelength of the illumination light. The optical axes of the camera 51, the illumination unit 52 and the indicator 53 pass through the camera aperture 61, the illumination unit aperture 62 and the indicator aperture 63, respectively.

When the driver status monitoring system is enabled, the light emitting element 57 of the illumination unit 52 and the light emitting element 58 of the indicator 53 light up simultaneously. In this case, if light emission intensity of the light emitting element 57 of the illumination unit 52 is relatively low and light emission intensity of the light emitting element 58 of the indicator 53 is relatively high, the occupants perceive the light emitted from the light emitting element 58 of the indicator 53 and passing through the indicator aperture 63 more strongly than the light emitted from the light emitting element 57 of the illumination unit 52 and passing through the illumination unit aperture 62, and hardly perceive the light emitted from the light emitting element 57 of the illumination unit 52. That is, it is possible to prevent near-infrared light emitted from the light emitting element 57 of the illumination unit 52 from causing stress to the occupants.

(2) When Apertures are Provided in Common

As shown in FIG. 23, a camera aperture 71 is formed in front of the image sensor 55 of the camera 51, and a common aperture 72 is formed in front of the light emitting element 57 of the illumination unit 52 and the light emitting element 58 of the indicator 53 in the driver's seat side outer frame 10. The respective apertures 71 and 72 are provided with a transmission film (not shown) that transmits the wavelength of the illumination light. The optical axis of the camera 51 passes through the camera aperture 71, and the optical axes of the illumination unit 52 and the indicator 53 pass through the common aperture 72.

In this case, if light emission intensity of the light emitting element 57 of the illumination unit 52 is relatively low and light emission intensity of the light emitting element 58 of the indicator 53 is relatively high, the light emitted from the light emitting element 57 of the illumination unit 52 is dominated by the light emitted from the light emitting element 58 of the indicator 53, and the occupants hardly perceive the light emitted from the light emitting element 57 of the illumination unit 52. That is, in this case as well, it is possible to prevent the near-infrared light emitted from the light emitting element 57 of the illumination unit 52 from causing stress to the occupants.

In the example described above, the camera 51, the illumination unit 52 and the indicator 53 are arranged in the vertical direction in the driver's seat side outer frame 10 of the display device 7 described in the first embodiment. However, the same applies to the case where the camera 51, the illumination unit 52 and the indicator 53 are arranged in the vertical direction in the passenger seat side outer frame 11 of the display device 7 described in the second embodiment, in the first connecting section 40 of the display device 31 described in the fourth embodiment, or in the second connecting section 40 of the display device 31 described in the fifth embodiment. That is, the position where the indicator 53 is disposed is not limited to the driver's seat side outer frame 10. Also, the number and arrangement of the light emitting element 57 of the illumination unit 52 and the light emitting element 58 of the indicator 53 are not limited.

Other Embodiments

Although the present disclosure has been described in accordance with the examples, the present disclosure should not be construed as limited to those examples or structures. The present disclosure encompasses various modifications and equivalent alterations. In addition, various combinations and forms, as well as other combinations and forms including more, less or only a single element, are also within the scope and spirit of the present disclosure.

Figure 24:
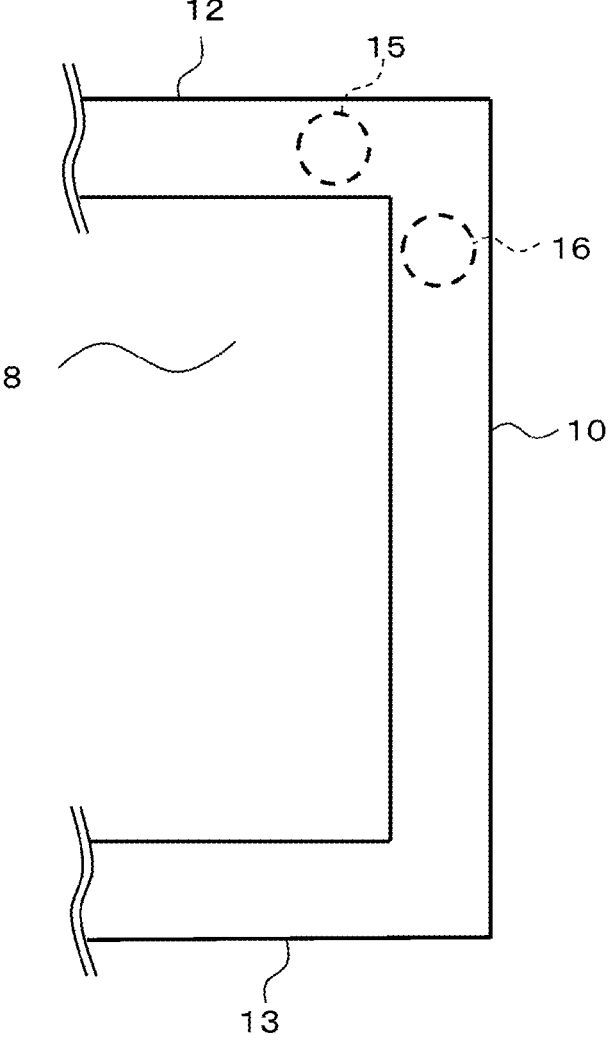
FIG. 24 is a schematic diagram illustrating an arrangement of an illumination unit and a camera.

As shown in FIG. 24, when the upper outer frame 12 has a vertical dimension sufficient to provide the illumination unit 15, the illumination unit 15 may be disposed in the upper outer frame 12 in a region close to the driver's seat side outer frame 10, and the camera 16 may be disposed on the upper end side of the driver's seat side outer frame 10, that is, in a region close to the illumination unit 15. Further, the positions of the illumination unit 15 and the camera 16 may be interchanged, and when the upper outer frame 12 has a vertical dimension sufficient to provide the camera 16, the camera 16 may be disposed in the upper outer frame 12 in a region close to the driver's seat side outer frame 10, and the illumination unit 15 may be disposed on the upper end side of the driver's seat side outer frame 10, that is, in a region close to the camera 16.

Figure 25:
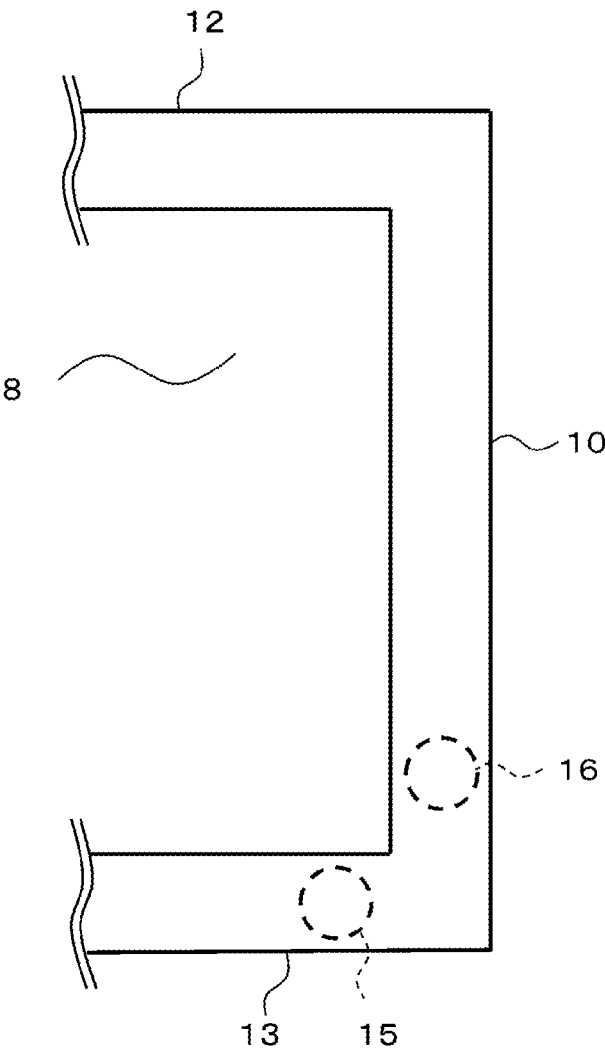
FIG. 25 is a schematic diagram illustrating an arrangement of an illumination unit and a camera.

As shown in FIG. 25, when the lower outer frame 13 has a vertical dimension sufficient to provide the illumination unit 15, the illumination unit 15 may be disposed in the lower outer frame 13 in a region close to the driver's seat side outer frame 10, and the camera 16 may be disposed on the lower end side of the driver's seat side outer frame 10, that is, in a region close to the illumination unit 15. In this case as well, the positions of the illumination unit 15 and the camera 16 may be interchanged, and when the lower outer frame 13 has a vertical dimension sufficient to provide the camera 16, the camera 16 may be disposed in the lower outer frame 13 in a region close to the driver's seat side outer frame 10, and the illumination unit 15 may be disposed on the lower end side of the driver's seat side outer frame 10, that is, in a region close to the camera 16.

In the configuration of FIGS. 24 and 25, the illumination unit 15 and the camera 16 are not aligned in the vertical direction. However, since the illumination unit 15 and the camera 16 are closely positioned, the angular difference between the optical axes of the camera 16 and the illumination unit 15 in the horizontal direction can be reduced compared with a conventional configuration in which the illumination unit 15 and the camera 16 are positioned with the display area 8 therebetween. Therefore, it is possible to prevent a decrease in detection accuracy in image recognition.

Figure 26:
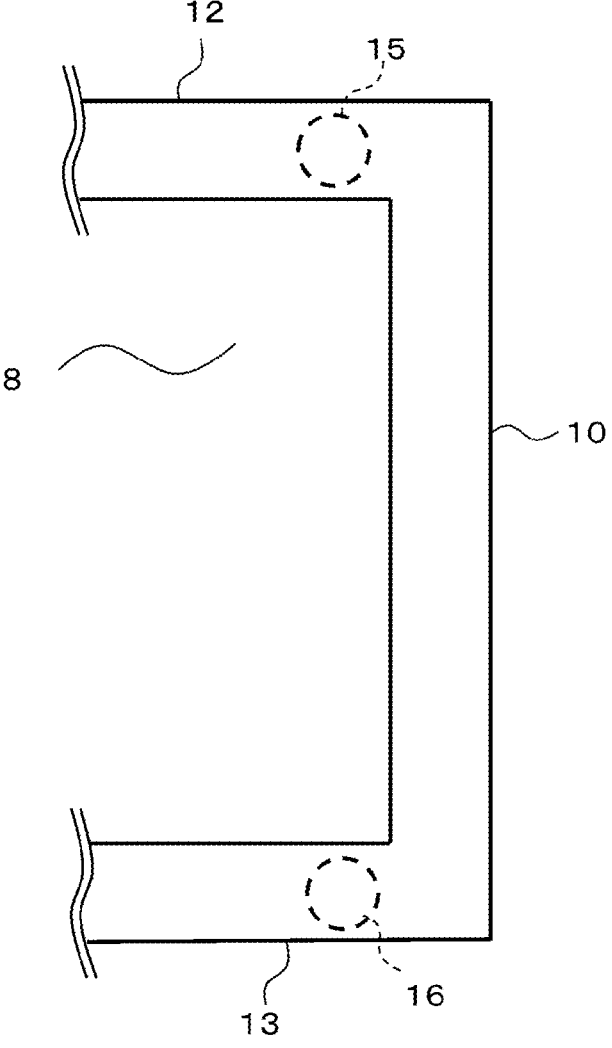
FIG. 26 is a schematic diagram illustrating an arrangement of an illumination unit and a camera.

As shown in FIG. 26, when the upper outer frame 12 has a vertical dimension sufficient to provide the illumination unit 15 and the lower outer frame 13 has a vertical dimension sufficient to provide the camera 16, the illumination unit 15 may be disposed in the upper outer frame 12 in a region close to the driver's seat side outer frame 10, and the camera 16 may be disposed in the lower outer frame 13 in a region close to the driver's seat side outer frame 10. In this case as well, the positions of the illumination unit 15 and the camera 16 may be interchanged, and when the upper outer frame 12 has a vertical dimension sufficient to provide the camera 16 and the lower outer frame 13 has a vertical dimension sufficient to provide the illumination unit 15, the camera 16 may be disposed in the upper outer frame 12 in a region close to the driver's seat side outer frame 10, and the illumination unit 15 may be disposed in the lower outer frame 13 in a region close to the driver's seat side outer frame 10. With this configuration, the angular difference between the optical axes of the camera 16 and the illumination unit 15 can be reduced, preventing a decrease in detection accuracy in image recognition.

Although the narrow-angle camera and the wide-angle camera having the horizontal angle of view of 180° or less are exemplified as the imaging unit, a fisheye camera having the horizontal angle of view larger than 180° may also be used. Further, although the driver and the passenger are exemplified as the imaging targets, rear seat occupants may also be included in the imaging targets.

What is claimed is:

1. An occupant imaging device that captures images of occupants inside a vehicle in which a display device having a display area is provided in front of and between a driver's seat and a passenger seat, the occupant imaging device comprising:

an illumination unit that illuminates an area around the face of an occupant seated in a seat, wherein the light emitted from the illumination unit is near-infrared light; and an imaging unit that captures images of the area around the face of the occupant seated in the seat, wherein the display device includes an outer frame extending on at least left and right sides of the display area, the illumination unit and the imaging unit are arranged in a vertical direction in a region of the outer frame of the display device excluding a passenger seat side portion, the occupant imaging device further comprises an indicator, the indicator, the illumination unit and the imaging unit being arranged in the vertical direction in the outer frame, and the imaging unit captures images of an area around the face of an occupant including at least a driver seated in the driver's seat, wherein:

the indicator indicates whether a driver status monitoring system is enabled or disabled;

the indicator is configured to light up when the illumination unit is emitting light and the driver status monitoring system is enabled; and light emission intensity of a light emitting element of the illumination unit is lower than light emission intensity of a light emitting element of the indicator while the light emitting element of the illumination unit and the light emitting element of the indicator light up simultaneously, wherein the light emission intensity of the illumination unit being lower than the light emitting element of the indicator, which are arranged in the vertical direction in the region of the outer frame of the display device excluding the passenger seat side portion, (i) causes the occupants to perceive the light emitted from the indicator more strongly than the light emitted from the illumination unit, and (ii) reduces stress on the occupants that is caused from the near-infrared light emitted from the illumination unit.

2. The occupant imaging device according to claim 1, wherein the illumination unit and the imaging unit are arranged in the vertical direction in a region of the outer frame of the display device excluding a passenger seat side portion, the region being a driver's seat side portion.

3. The occupant imaging device according to claim 1, wherein optical axes of the illumination unit and the imaging unit are directed toward the face of a driver seated in the driver's seat.

4. The occupant imaging device according to claim 3, wherein the outer frame has an inclined surface which is inclined relative to a display surface of the display area, and optical axes of the illumination unit and the imaging unit are in a direction normal to the inclined surface.

5. The occupant imaging device according to claim 1, wherein a first aperture through which light of the illumination unit passes and a second aperture through which light of the indicator passes are separately provided in the outer frame.

6. The occupant imaging device according to claim 1, wherein a first aperture through which light of the illumination unit passes and a second aperture through which light of the indicator passes are provided in common in the outer frame.

7. The occupant imaging device according to claim 1, wherein the indicator indicates whether a driver status monitoring system is enabled or disabled.

8. The occupant imaging device according to claim 1, wherein the imaging unit that captures images of an area around a headrest of a seat where the occupant to be imaged is seated.

9. An occupant imaging device that captures images of occupants inside a vehicle in which a display device having a plurality of display areas arranged side by side in a horizontal direction is provided in front of and between a driver's seat and a passenger seat, the occupant imaging device comprising:

an illumination unit that illuminates an area around the face of an occupant seated in a seat, wherein the light emitted from the illumination unit is near-infrared light; and an imaging unit that captures images of the area around the face of the occupant seated in the seat, wherein the display device includes an outer frame extending on at least left and right sides of the display area, the illumination unit and the imaging unit are arranged in a vertical direction in a region of the outer frame of the display device excluding a passenger seat side portion or in a connecting section between the plurality of display areas, and the occupant imaging device further comprises an indicator, the indicator, the illumination unit and the imaging unit being arranged in the vertical direction in the outer frame, and the imaging unit captures images of an area around the face of an occupant including at least a driver seated in the driver's seat, wherein:

the indicator indicates whether a driver status monitoring system is enabled or disabled;

the indicator is configured to light up when the illumination unit is emitting light and the driver status monitoring system is enabled; and light emission intensity of a light emitting element of the illumination unit is lower than light emission intensity of a light emitting element of the indicator while the light emitting element of the illumination unit and the light emitting element of the indicator light up simultaneously, wherein the light emission intensity of the illumination unit being lower than the light emitting element of the indicator, which are arranged in the vertical direction in the region of the outer frame of the display device excluding the passenger seat side portion, (i) causes the occupants to perceive the light emitted from the indicator more strongly than the light emitted from the illumination unit, and (ii) reduces stress on the occupants that is caused from the near-infrared light emitted from the illumination unit.

10. The occupant imaging device according to claim 9, wherein the illumination unit and the imaging unit are arranged in the vertical direction in a region of the outer frame of the display device excluding a passenger seat side portion, the region being a driver's seat side portion.

11. The occupant imaging device according to claim 9, wherein optical axes of the illumination unit and the imaging unit are directed toward the face of a driver seated in the driver's seat.

12. The occupant imaging device according to claim 11, wherein the display device has an inclined surface which is inclined relative to a display surface of the display area, and optical axes of the illumination unit and the imaging unit are in a direction normal to the inclined surface.

13. The occupant imaging device according to claim 9, wherein a first aperture through which light of the illumination unit passes and a second aperture through which light of the indicator passes are separately provided in the outer frame.

14. The occupant imaging device according to claim 9, wherein a first aperture through which light of the illumination unit passes and a second aperture through which light of the indicator passes are provided in common in the outer frame.

\* \* \* \* \*